US009388477B1

(12) United States Patent
Sun et al.

(10) Patent No.: US 9,388,477 B1
(45) Date of Patent: Jul. 12, 2016

(54) NOBLE METAL SUPERPARTICLES AND METHODS OF PREPARATION THEREOF

(71) Applicant: UChicago Argonne, LLC, Chicago, IL (US)

(72) Inventors: Yugang Sun, Naperville, IL (US); Yongxing Hu, Fremont, CA (US)

(73) Assignee: UChicago Argonne, LLC, Chicago, IL (US)

(*) Notice: Subject to any disclaimer, the term of this patent is extended or adjusted under 35 U.S.C. 154(b) by 0 days.

(21) Appl. No.: 14/600,908

(22) Filed: Jan. 20, 2015

(51) Int. Cl.
*B01J 23/50* (2006.01)
*B01J 23/38* (2006.01)
*B01J 23/40* (2006.01)
*B01J 23/42* (2006.01)
(Continued)

(52) U.S. Cl.
CPC ............ *C22B 11/04* (2013.01); *B01J 23/38* (2013.01); *B01J 23/42* (2013.01); *B01J 23/44* (2013.01); *B01J 23/464* (2013.01); *B01J 23/468* (2013.01); *B01J 35/0033* (2013.01); *B01J 35/026* (2013.01); *B22F 9/24* (2013.01); *C22C 5/04* (2013.01)

(58) Field of Classification Search
CPC .... B01J 13/0043; B01J 35/0013; B01J 23/38; B01J 23/40; B01J 23/42; B01J 23/44; B01J 23/464; B01J 23/468; B01J 23/50; B22F 1/0088; B22F 1/0092; B22F 1/0096; B22F 1/0022; B22F 2001/0037; B22F 9/24; B82Y 30/00; B82Y 40/00; C01G 55/00; C01G 55/002; C01G 55/005; C01G 5/006; C01G 5/02; C01G 7/006; C01P 2004/64; C01P 2004/80; C01P 2004/82; C01P 2004/84

USPC ............... 502/230, 330, 339, 344; 516/9, 97; 420/505, 507–511, 590; 252/514; 75/711, 724; 106/1.2–1.251; 428/403; 427/215–218; 436/80, 84; 424/618, 424/646, 649
See application file for complete search history.

(56) References Cited

U.S. PATENT DOCUMENTS 3,011,920 A * 12/1961 Shipley, Jr. ............. C23C 18/28
106/1.11
3,459,563 A * 8/1969 Terashima ........... G03C 1/8255
106/1.05
(Continued)

OTHER PUBLICATIONS

"Preparation of colloidal silver dispersions by the polyol process Part 2.—Mechanism of particle formation," Pierre-Yves Silvert et al. J. Mater. Chem., 1997, 7(2), pp. 293-299.*
(Continued)

*Primary Examiner* — Patricia L Hailey
(74) *Attorney, Agent, or Firm* — Foley & Lardner LLP

(57) ABSTRACT

A method comprises heating an aqueous solution of colloidal silver particles. A soluble noble metal halide salt is added to the aqueous solution which undergoes a redox reaction on a surface of the silver particles to form noble metal/silver halide SPs, noble metal halide/silver halide SPs or noble metal oxide/silver halide SPs on the surface of the silver particles. The heat is maintained for a predetermined time to consume the silver particles and release the noble metal/silver halide SPs, the noble metal halide/silver halide SPs or the noble metal oxide/silver halide SPs into the aqueous solution. The aqueous solution is cooled. The noble metal/silver halide SPs, the noble metal halide/silver halide SPs or noble metal oxide/silver halide SPs are separated from the aqueous solution. The method optionally includes adding a soluble halide salt to the aqueous solution.

28 Claims, 21 Drawing Sheets

(51) Int. Cl.
*B01J 23/44* (2006.01)
*B01J 23/46* (2006.01)
*C22B 3/00* (2006.01)
*B01J 35/02* (2006.01)
*B01J 35/00* (2006.01)
*B22F 9/24* (2006.01)
*C22C 5/04* (2006.01)

(56) References Cited

U.S. PATENT DOCUMENTS

| | | | | |
|---|---|---|---|---|
| 3,814,696 | A * | 6/1974 | Verdone et al. | G03C 8/28 106/1.15 |
| 6,245,494 | B1 * | 6/2001 | Andriessen | B01J 13/0043 430/270.11 |
| 6,699,507 | B1 * | 3/2004 | Albrecht | A61K 47/48861 424/489 |
| 7,621,976 | B2 * | 11/2009 | Hampden-Smith | B01J 2/003 75/338 |
| 8,247,325 | B2 | 8/2012 | Sun | |
| 8,540,899 | B2 * | 9/2013 | Miller | G11C 13/0009 252/364 |
| 8,597,397 | B2 * | 12/2013 | Kunze | B22F 1/0022 75/362 |
| 2003/0124259 | A1 * | 7/2003 | Kodas | C09D 11/30 427/376.6 |
| 2003/0148024 | A1 * | 8/2003 | Kodas | C23C 18/06 427/125 |
| 2003/0161959 | A1 * | 8/2003 | Kodas | C09D 11/30 427/376.2 |
| 2003/0175411 | A1 * | 9/2003 | Kodas | C09D 11/30 427/58 |
| 2006/0065075 | A1 * | 3/2006 | Chang | B22F 1/0022 75/371 |
| 2006/0159603 | A1 * | 7/2006 | Vanheusden | B22F 1/0018 423/1 |
| 2008/0242533 | A1 * | 10/2008 | Saito | B01D 53/9445 502/159 |
| 2009/0075815 | A1 * | 3/2009 | Kaneda | B01J 23/44 502/339 |
| 2014/0077121 | A1 | 3/2014 | Sun et al. | |

OTHER PUBLICATIONS

"Synthesis of colloidal metal and metal alloy nanoparticles for electrochemical energy applications," Hongjun You et al. Chem. Soc. Rev., 2013, 42, pp. 2880-2904.*

* cited by examiner

NOBLE METAL SUPERPARTICLES AND METHODS OF PREPARATION THEREOF

The United States Government claims certain rights in this invention pursuant to Contract No. W-31-109-ENG-38 between the United States Government and the University of Chicago and/or pursuant to DE-AC02-06CH11357 between the United States Government and UChicago Argonne, LLC representing Argonne National Laboratory.

TECHNICAL FIELD

The present disclosure relates generally to the field of colloidal metallic nanoparticle assemblies.

BACKGROUND

Superparticles (SPs) or colloidal superparticles (CSPs) are assemblies of crystalline structures that include a plurality of nanoparticles arranged in a primary and/or a secondary hierarchical structure to form the SPs. SPs combine the intrinsic physical characteristics of their nanoparticle building blocks including a large surface to volume ratio and higher surface area. SPs couple the properties of individual nanoparticles to exhibit new collective properties. The shape and size of SPs can be tuned by varying the shape, size, and composition of their nanoparticle building blocks.

Conventional strategies for synthesizing colloidal superparticles (SPs) generally rely on self-assembly of pre-synthesize nanoparticles with well-controlled size, size distribution, shape, composition and surface chemistry. The driving force for self-assembly originates from solvent evaporation, polymer templating, electrostatic interaction, hydrogen bonding, and/or interfacial tension. Such self-assembly methods can include induced solvophobic interactions and micro-emulsion templating to enable self-assembly of nanoparticle building blocks into desired SPs.

Conventional self-assembly methods have found great success in synthesizing SPs made of a large number of nanocrystals with different shapes and compositions. While such SPs exhibit significantly enhanced performance, for example enhanced magnetic and optical properties relative to individual nanoparticles, the high surface area, which is considered as the most important property of the nanoparticles, no longer exists in such conventional SPs. This is because conventional self-assembly methods use surfactants, which can include organic ligands, during SP synthesis. The organic ligands that coat the surface of the nanoparticle building blocks are critical for conventional assembly of the nanoparticles into SPs, and occupy the gaps between the individual nanoparticle building blocks in SPs. The presence of surfactants reduces the accessible surface area in the conventional SPs relative to the overall surface area of the freestanding building block nanoparticles.

Although the organic ligands or otherwise surfactants can be removed through calcination of the SPs at elevated temperature, such high temperature processes are detrimental to the stability and mesoscopic structures of the SPs. Alternatively, deposition of surfactant molecules on the surfaces of individual SPs can be avoided by integrating the synthesis of individual nanoparticles and their aggregation into SPs in a single step. However, such one step synthesis process yield SPs including clean surfaces which always undergo entropy-driven aggregation to coalesce and fuse together to reduce the surface energy as well as the surface area.

SUMMARY

Embodiments described herein relate generally to methods of preparing noble metal SPs, and in particular to methods of preparing platinum group (platinum, palladium, rhodium and iridium) SPs which are free of organic ligands and do not coalesce.

In some embodiments, a method comprises heating an aqueous solution of colloidal silver particles. A soluble noble metal halide salt is added to the aqueous solution. The soluble noble metal halide salt undergoes a redox reaction on a surface of the colloidal silver particles to form at least one of noble metal/silver halide SPs, noble metal halide/silver halide SPs and noble oxide/silver halide SPs on the surface of the silver particles. The heat is maintained for a predetermined time to consume the silver particles and release the at least one of the noble metal/silver halide SPs, the noble metal halide/silver halide SPs and noble oxide/silver halide SPs into the aqueous solution. The aqueous solution is cooled to precipitate at least one of the noble metal/silver halide SPs, the noble metal halide/silver halide SPs and noble oxide/silver halide SPs from the aqueous solution. The at least one of the noble metal/silver halide SPs, the noble metal halide/silver halide SPs and noble oxide/silver halide SPs are separated from the aqueous solution. In some embodiments, the method optionally includes adding a halide salt to the aqueous solution.

In other embodiments, a method of fabricating platinum SPs that comprise a plurality of platinum nanoparticles arranged in a three-dimensional structure having a hemispherical dome shape with a flat bottom, a hollow core and a plurality of pores defined between the platinum nanoparticles, comprises heating an aqueous solution of colloidal silver particles. A soluble platinum halide salt is added to the aqueous solution. The platinum halide salt undergoes a redox reaction on a surface of the silver particles to form a plurality of platinum/silver halide SPs disposed on the surface of the silver particles. The heat is maintained for a predetermined time to consume the silver particles and release the platinum/silver halide SPs in the aqueous solution. The aqueous solution is cooled. The platinum/silver halide SPs are separated from the aqueous solution. The platinum/silver halide SPs are incubated in an aqueous ammonia solution to dissolve the silver halide and produce the platinum SPs. In some embodiments, the surface of the platinum SPs is free of organic ligands.

In still other embodiments, a catalyst includes noble metal SPs. The noble metal SPs include a plurality of noble metal nanoparticles arranged in a three-dimensional structure. A surface of the noble metal SPs is free of organic ligands. Furthermore, the noble metal SPs have a zeta potential sufficient to prevent the noble metal SPs from aggregating. In some embodiments, the noble metal includes platinum, palladium, rhodium or iridium.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF DRAWINGS

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

FIG. 3 panel (a) shows an Ag particle; panels (b) and (c) show Pt/AgCl SPs forming on the surface of the Ag particles; panel (d) shows the Pt/AgCl SPs growing while consuming the Ag particles; panel (e) shows the Pt/AgCl SPs released after the Ag particle is consumed; and panel (f) shows Pt SPs after dissolution of the AgCl.

Figure 1:
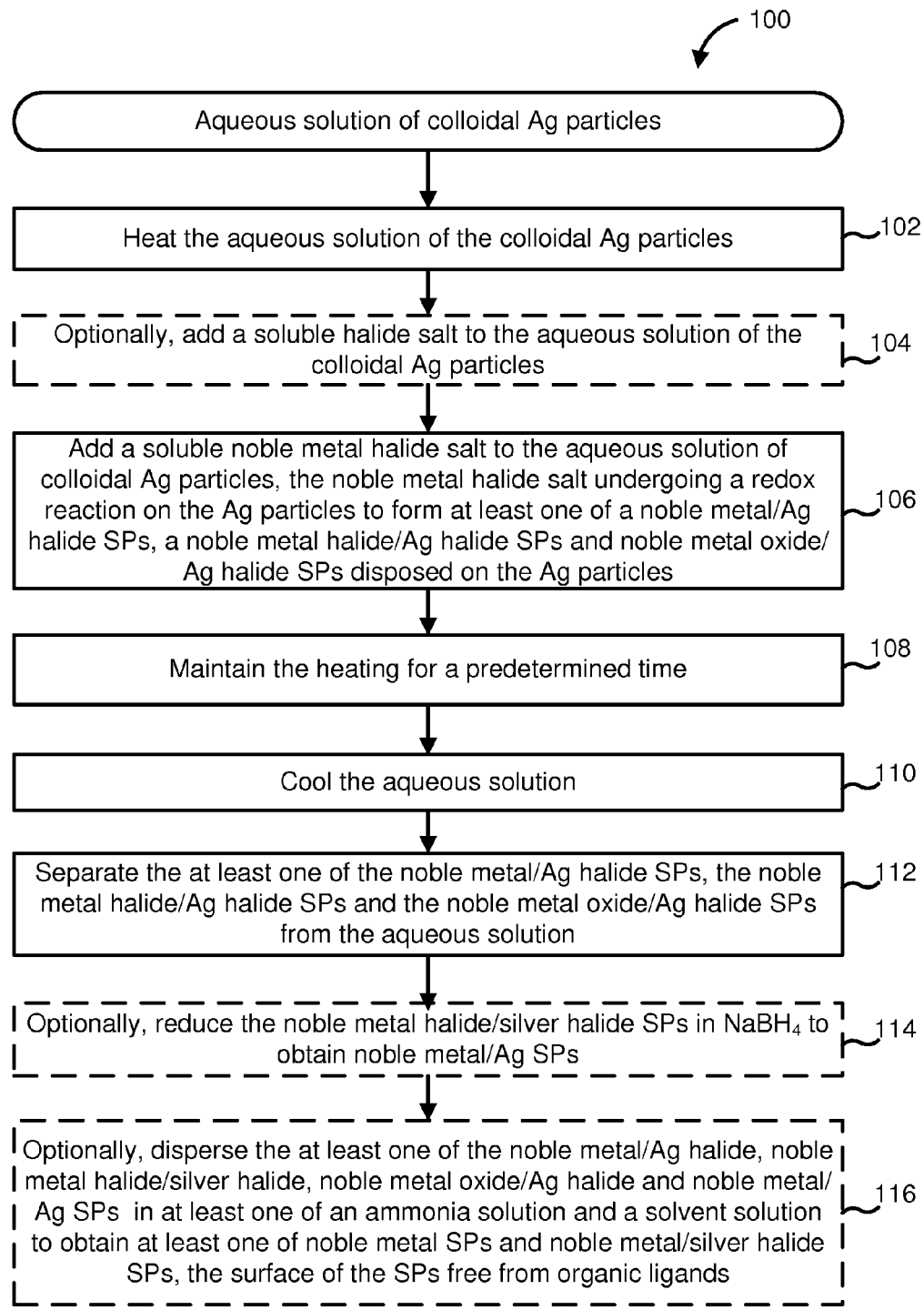
FIG. 1 is a schematic flow diagram of a method of synthesizing noble metal/silver (Ag) halide SPs, noble metal halide/silver halide SPs and noble metal oxide/silver halide SPs, and noble metal SPs, according to an embodiment.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION OF VARIOUS EMBODIMENTS

Embodiments described herein relate generally to methods of preparing noble metal SPs, and in particular to methods of preparing platinum group (platinum, palladium, rhodium and iridium) SPs which are free of organic ligands and do not coalesce.

Embodiments of the noble metal superparticles described may provide several benefits including, for example: (1) having porous structures that exhibit nearly pristine surfaces; (2) having surfaces that are free of organic ligands; (3) having a high surface-to-volume ratio relative to conventional SPs which allow a larger surface area of the SPs to be available for physical and chemical interactions; (4) having high zeta potential which prevents agglomeration of the noble metal SPs without the use of organic ligands or otherwise surfactants; and (5) serving as high efficiency catalysts which have higher catalytic conversion efficiencies relative to conventional nanostructures.

As used herein, the term "superparticles (SPs)" is used to refer to assemblies or crystalline structures that include a plurality of nanoparticles arranged in a primary and/or a secondary hierarchical structure. The SPs can be formed solely from noble metal nanoparticles or include Ag halide nanoparticles interspersed between the noble metal nanoparticles to form composite SPs. Such composite SPs are denoted by a "/" between each of the different species of nanoparticles that form the SPs. For example, Pt/AgCl SPs refers to SPs that include Pt nanoparticles and AgCl nanoparticles interspersed between the Pt nanoparticles. Similar Pd/PdO/AgCl SPs refers to SPs that includes Pd nanoparticles, PdO nanoparticles and AgCl nanoparticles.

FIG. 1 is a schematic flow diagram of an exemplary method 100 of forming noble metal SPs that are polycrystalline (i.e., composite SPs that include crystals of noble metal, noble metal halide, noble metal oxide, and/or Ag halide). SPs formed using the method 100 are free of organic ligands or otherwise surfactants but do not coalesce. In various embodiments, the noble metal is selected from the group consisting of Pt, Pd, Rh, and Ir.

The method 100 includes heating an aqueous solution of colloidal Ag particles, at 102. The heating can include raising the temperature of the aqueous solution to its boiling point (e.g., about 100 degrees Celsius). The Ag particles can have any suitable shape or size. In some embodiments, the Ag particles can include silver nanospheres, irregular silver particle aggregates, silver nanowires, gold core-silver shell nanoparticles, silver nanosheets and silver microparticles. It is to be noted that the synthesis of the SPs is independent of the shape or morphology of the Ag particles. In some embodiments, the Ag particles can have a size (e.g., diameter) of about 30 nm to about 200 nm. In other embodiments, the Ag particles can have a much larger size, for example, in the range of about 200 nm to about 5,000 nm (5 microns). In particular embodiments, the aqueous solution is stirred (e.g., using a magnetic stirrer) during the heating to prevent the Ag particles from coalescing.

The surface of the Ag particles can have non-uniform surface chemistry. For example, in some embodiments, at least a portion of a surface of the Ag particle is coated with an organic ligand. For example, the colloidal Ag particles can be prepared using a process in which an organic ligand (e.g., a surfactant that includes an organic ligand such as sodium citrate tribasic dihydrate) is used. The organic ligand can be absorbed or adsorbed on at least a portion of the surface of the Ag particles to form non-uniform surface chemistry. The portions that are not coated with the organic ligand serve as nucleation sites for the nucleation and growth of the SPs on the surface of the Ag particles, as described herein.

In some embodiments, a soluble halide salt (e.g., potassium iodide (KI)) is optionally added to the aqueous solution of the colloidal Ag particles, at 104. In such embodiments, the noble metal includes rhodium and iridium, as described herein. The soluble halide salt can be added to aqueous solution before heating. The soluble halide salt (e.g., KI) can boost the oxidation of Ag particles due to the much lower solubility of AgI than AgCl. In such cases, the Ag particles are oxidized by air to form AgI, as described herein.

A soluble noble metal halide salt is added to the aqueous solution, at 106. The soluble noble metal halide salt undergoes a redox reaction on the surface of the colloidal Ag particles to form at least one of noble metal/Ag halide SPs, noble metal halide/Ag halide SPs and noble metal oxide/Ag halide SPs on the surface of the Ag particles. As described before, the portion of the surface of the Ag particles that does not include the organic ligand absorbed or adsorbed thereon can serve as nucleation sites for initiation of the redox reaction and formation of the SPs. In some embodiments, the aqueous solution is stirred (e.g., using a magnetic stirrer) to facilitate the redox reaction.

In some embodiments, the noble metal is platinum and the SPs include Pt/Ag halide SPs. In other embodiments, the noble metal includes Pd and the SPs include Pd/PdO/Ag halide SPs. In still other embodiments, in which the halide salt (e.g., KI) is added to aqueous solution, the noble metal is Rh and the SPs include Rh halide/Ag halide SPs. In yet other embodiments, in which the halide salt (e.g., KI) is added to aqueous solution, the noble metal is Ir and the SPs include Ir halide/Ag halide SPs.

Expanding further, in particular embodiments, the soluble noble metal halide salt can include a chloride salt of the noble metal. For example, in some embodiment, the noble metal is Pt and the soluble noble metal halide salt is an aqueous solution of $Na_2PtCl_4$. In such embodiments, the surface of the Ag particles serves as a sacrificial substrate to prompt reduction of the $PtCl_4^-$ ions. Addition of the aqueous solution $Na_2PtCl_4$ initiates the galvanic replacement reaction to form Pt atoms on the surface of the Ag particles and dissolve the Ag particles into $Ag^+$ ions. The resulting Pt atoms condense on the surface of the Ag particles into Pt nanocrystals to minimize their surface energy. Simultaneously free $Cl^-$ ions are released form the $PtCl_4^-$ and precipitate with $Ag^+$ generated from the dissolution of the Ag particles to form AgCl. Since there is no surfactant in the solution the resulting AgCl prefer to co-precipitate with Pt nanocrystals to form Pt/AgCl SPs on the surface of the Ag particles.

In other embodiments, the noble metal is Pd and the soluble noble metal halide salt is $Na_2PdCl_4$. In such embodiments, in addition to directly reacting with Ag particles (similar to $Na_2PtCl_4$), $PdCl_4^{2-}$ ions hydrolyze Pd to PdO such that the SPs formed on the surface of the Ag particles to form Pd/PdO/AgCl SPs.

In still other embodiments, the noble metal is Rh and the soluble noble metal halide salt is $Na_3RhCl_6$. $Na_3RhCl_6$ does not allow oxidation of Ag colloidal particles under the reaction conditions used for producing Pt/AgCl SPs therefore, the soluble halide salt KI is added to the boost the oxidation of Ag particles due to the much lower solubility of AgI than AgCl. The Ag particles are oxidized by air to form AgI, and $RhCl_6^{3-}$ ions are transformed to $RhI_3$ through anion exchange, to form $RhI_3$/AgI SPs.

In yet other embodiments, the noble metal is Ir and the soluble noble metal halide salt is $Na_3IrCl_6$. Similar to $Na_3RhCl_6$, $Na_3IrCl_6$ also does not allow oxidation of Ag colloidal particles under the reaction conditions used for producing Pt/AgCl SPs. Therefore, the soluble halide salt KI is added to the boost the oxidation of Ag particles due to the much lower solubility of AgI than AgCl. The Ag particles are oxidized by air to form AgI, and $IrCl_6^{3-}$ ions are transformed to $IrI_3$ through anion exchange, to form $IrI_3$/AgI SPs.

The heating is maintained for a predetermined time, at 108. This maintaining allows the Ag particles to be consumed and release the at least one of the noble metal/Ag halide SPs (e.g., Pt/AgCl SPs or Pd/PdO/AgCl SPs) and the noble metal halide/Ag halide (e.g., $RhI_3$/AgI SPs or $IrI_3$/AgI SPs) into the aqueous solution. The heating can be maintained for any suitable time, for example 1 minute, 2 minutes, 4 minutes, 6 minutes, 8 minutes, 10 minutes, 12 minutes, 14 minutes, 16 minutes, 18 minutes or 20 minutes inclusive of all ranges and values therebetween. In some embodiments, the heating is maintained until substantially all (e.g., greater than 99%) of the Ag particles are consumed.

The aqueous solution is cooled at 108. The aqueous solution can be cooled in ambient conditions to room temperature. For example, the aqueous solution can be cooled by removing the heat source and allowing the liquid to cool naturally under ambient conditions to room temperature.

The at least one of the noble metal/silver halide SPs (e.g., Pt/AgCl SPs or Pd/PdO/AgCl SPs) and the noble metal halide/silver halide SPs (e.g., $RhI_3$/AgI SPs or $IrI_3$/AgI SPs) are separated from the aqueous solution, at 110. For example, the SPs can be separated from the aqueous solution by precipitation and collecting the supernatant, which can be further centrifuged to collect the precipitated fraction containing the SPs. In particular embodiments, the noble metal/silver halide SPs (e.g., Pt/AgCl SPs or Pd/PdO/AgCl SPs) and the noble metal halide/silver halide SPs (e.g., $RhI_3$/AgI SPs or $IrI_3$/AgI SPs) include halide anions (e.g., $Cl^-$ or $I^-$) absorbed on a surface of the at least one of the noble metal/silver halide superparticles and the noble metal halide/silver halide superparticles. The halide anions produces a negative charge on the surface of the SPs to prevent the at least one of the noble metal/silver halide SPs and the noble metal halide/silver halide SPs from coalescing. In other words, the negative charge produced by the absorbed or adsorbed halide anions repels adjacent SPs from each other preventing them from coalescing.

In some embodiments, the noble metal halide/Ag halide SPs are reduced in $NaBH_4$ to obtain noble metal/Ag SPs. For example, the noble metal halide/Ag halide SPs can include $RhI_3$/AgI SPs. The $RhI_3$/AgI SPs have poor crystallinity without specific lattice reflections in electron diffraction patterns. To improve the crystallinity, the $RhI_3$/AgI SPs is reduced in an aqueous solution of $NaBH_4$ to form Rh/Ag metallic SPs. In some embodiments, the aqueous solution of $NaBH_4$ is stirred (e.g., using a magnetic stirrer) to facilitate the reduction reaction.

In some embodiments, the at least one of the noble metal/Ag halide, noble metal halide/silver halide and noble metal/Ag superparticles are dispersed in at least one of an ammonia solution and a solvent solution to obtain at least one of noble metal superparticles and noble metal/silver halide nanoparticles, at 116. The SPs obtained are free of organic ligands. Furthermore, the SPs have a diameter of greater than 20 nm, for example in the range of about 20 nm to about 200 nm inclusive of all ranges and values therebetween.

The size of the SPs can be controlled by varying the concentrations or otherwise volume of the soluble metal halide salt solution used and/or varying the concentration of the colloidal Ag particles or otherwise volume of the aqueous solution of Ag colloidal particles. In one embodiments, the volume of a 0.01 M metal halide salt solution can be varied in the range of 1 mL to 1.4 mL in a 10 mL 0.005 M aqueous solution of colloidal Ag particles to obtain SPs having a size in the range of about 20 nm up to 55 nm. Increasing the volume of the metal halide salt beyond 1.4 mL may not result in a subsequent increase in the size of the SPs without increasing the volume of the colloidal Ag aqueous solution.

In other embodiments, the volume of a 0.005 M colloidal Ag aqueous can be varied between 10 mL and 150 mL at a constant injection rate of 0.01 M noble metal halide salt solution of about 10 μL/sec to obtain SPs having a size in the range of about 55 nm to about 200 nm.

For example, in one embodiment, the SPs include Pt/AgCl SPs. In such embodiments, the Pt/AgCl SPs are dispersed in an aqueous ammonia solution which selectively dissolves the AgCl. The leftover Pt nanocrystals reassemble into porous Pt SPs having a hemispherical dome shape with a flat base and a hollow core. Since no surfactant is used during the method 100, a surface of the Pt SPs is free of organic ligands or otherwise surfactants.

In another embodiment, the SPs include Pd/PdO/AgCl SPs. In such embodiments, the Pd/PdO/AgCl SPs are dispersed in an aqueous solution of ammonia to dissolve the AgCl nanocrystals and yield PdO/Pd SPs. The PdO/Pd SPs are collected and then dispersed in a solvent solution (e.g., an ethanol solution) to reduce the PdO nanocystals and produce Pd SPs. The dispersing in the solvent solution can include a solvothermal treatment process in which the solvent (e.g., ethanol) is heated to a predetermined temperature. In some embodiments, the solvent solution is stirred (e.g., using a magnetic stirrer) to facilitate the reduction reaction. In one embodiment, the solvent can be heated to a temperature higher than its boiling temperature, for example up to about 150 degrees Celsius. Since no surfactant is used during the method 100, a surface of the Pd SPs is free of organic ligands or otherwise surfactants.

In yet another embodiment, the SPs include Rh/Ag SPs. The Rh/Ag SPs are dispersed in a solvent solution (e.g., an ethanol solution) to reduce the Ag nanocystals and produce Rh SPs. The dispersing in the solvent solution can include a solvothermal treatment process in which the solvent (e.g., ethanol) is heated to a predetermined temperature. In some embodiments, the solvent solution is stirred (e.g., using a magnetic stirrer) to facilitate the reduction reaction. In one embodiment, the solvent can be heated to a temperature of up to about 150 degrees Celsius. Since no surfactant is used during the method 100, a surface of the Rh SPs is free of organic ligands or otherwise surfactants.

In still another embodiment, the SPs include $IrI_3$/AgI SPs. The $IrI_3$/AgI SPs are dispersed in a solvent solution (e.g., an ethanol solution) to reduce the amorphous $IrI_3$ to form Ir nanocrystals and produce Ir/AgI SPs. The dispersing in the solvent solution can include a solvothermal treatment process in which the solvent (e.g., ethanol) is heated to a predetermined temperature. In one embodiment, the solvent can be heated to a temperature of up to about 150 degrees Celsius. In some embodiments, the solvent solution is stirred (e.g., using a magnetic stirrer) to facilitate the reduction reaction. Unlike Pt, Pd and Rh, presence of AgI stabilizes and supports the SPs to maintain the SP structures. Thus, treatment of the $Ir_3I$/Ag ISPs with the solvent solution is controlled to prevent reduction of all the AgI included in the SPs. Since no surfactant is used during the method 100, a surface of the Ir/AgI SPs is free of organic ligands or otherwise surfactants.

Having described these general concepts, various examples of methods of forming noble metal SPs and catalysts formed therefrom are described. These embodiments are only examples and many other embodiments of methods of preparing noble metal SPs that are free of organic ligands are contemplated.

Figure 2:
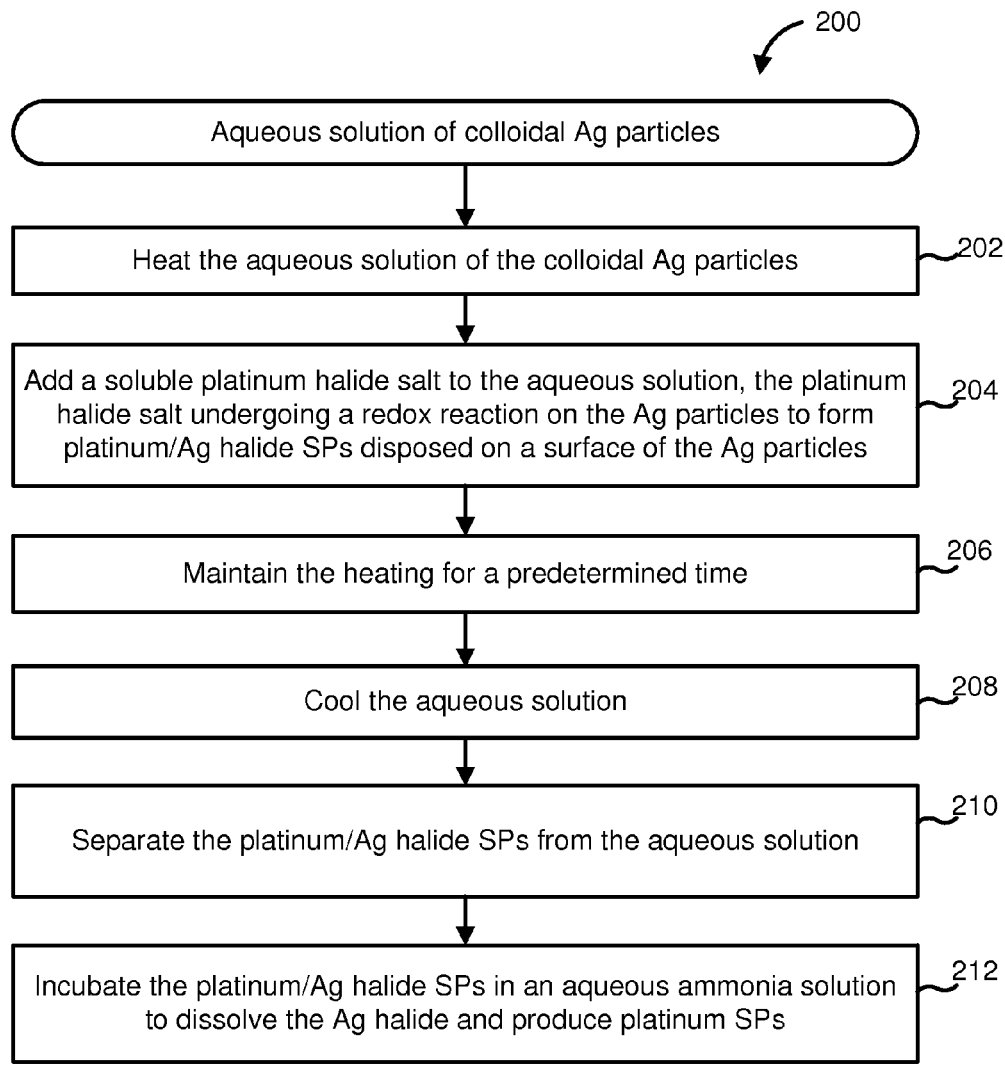
FIG. 2 is a schematic flow diagram of a method of synthesizing platinum (Pt) SPs, according to another embodiment.
Figure 3:
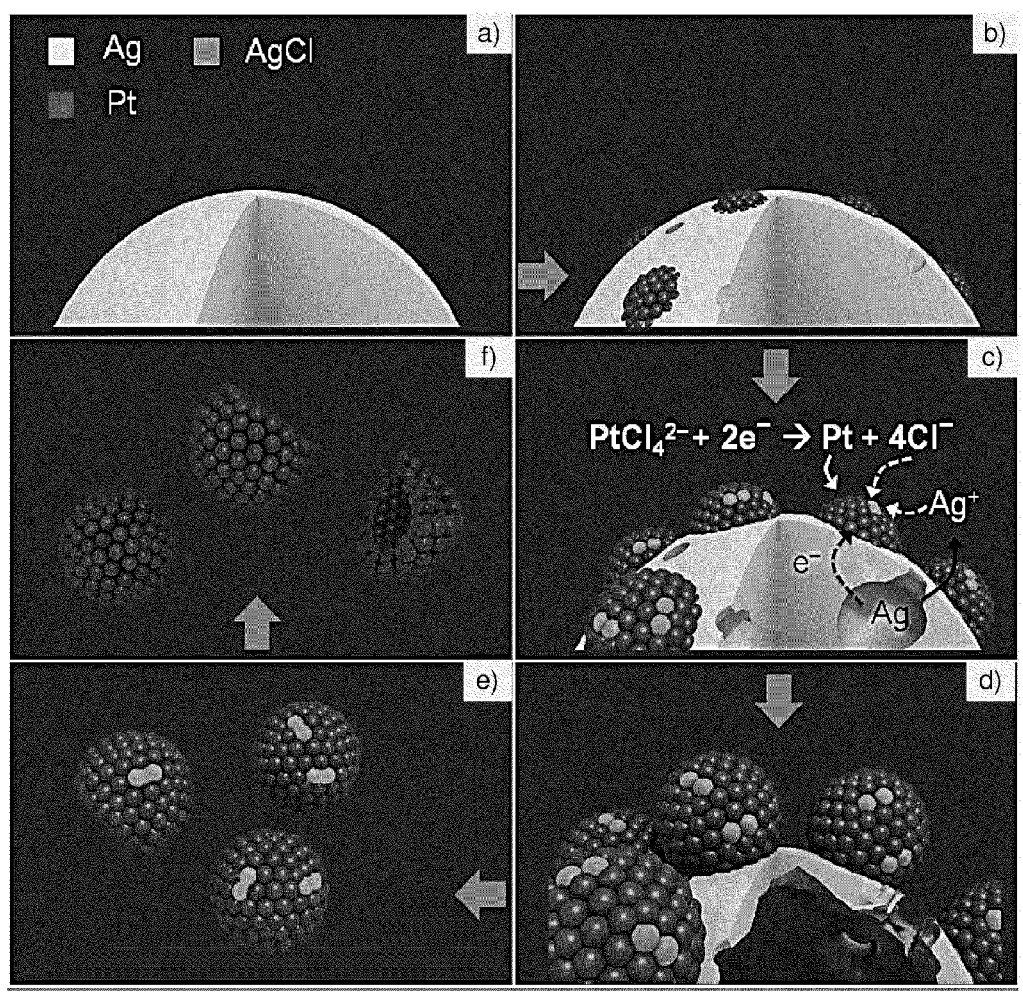
FIG. 3 is a schematic illustration of the method of FIG. 2.

FIG. 2 is a schematic flow diagram of a method 200 for preparing Pt SPs, and FIG. 3 shows a schematic illustration of various operations included in the method 200 for preparing the Pt SPs. The Pt SPs prepared using the method 200 include a plurality of platinum nanoparticles having a hemispherical dome shape with a flat bottom, a hollow core and a plurality of pores between the platinum nanoparticles.

The method 200 includes heating an aqueous solution of colloidal Ag particles, at 202. The heating can include raising the temperature of the aqueous solution to its boiling point (e.g., about 100 degrees Celsius). The Ag particles can have any suitable shape or size. In some embodiments, the Ag particles can include silver nanospheres, irregular silver particle aggregates, silver nanowires, gold core silver shell nanoparticles, silver nanosheets and silver microparticles. In some embodiments, the Ag particles can have a size (e.g., diameter) of about 30 nm to about 200 nm. In other embodiments, the Ag particles can have a much larger size, for example, in the range of about 200 nm to about 5,000 nm (5 microns). For example, FIG. 2 panel (a) shows a portion of a Ag particle (e.g., a Ag nanoparticle) used as the substrate for the growth of the SPs.

The Ag particles are synthesized with small surfactant molecules (e.g., acetonitrile and citrates), which do not bond strongly to the Ag surfaces. Washing the Ag particles several times allows partial removal of the surfactant molecules adsorbed on the particles, leaving non-uniformly covered Ag surfaces to react with Pt halide ions (e.g., $PtCl_4^-$ ions), as described herein. In particular embodiments, the aqueous solution is stirred (e.g., using a magnetic stirrer) during the heating to prevent the Ag particles from coalescing.

A soluble platinum halide salt is added to the aqueous solution, at 204. The platinum halide salt undergoes a redox reaction on a surface of the Ag particles to form a plurality of Pt/Ag halide SPs disposed on the surface of the Ag particles. As described before, the portion of the surface of the Ag particles that does not include the organic ligand absorbed or adsorbed thereon (e.g., the locations shown as having dimples on the Ag particle in FIG. 3 panel (b)) can serve as nucleation sites for initiation of the redox reaction and formation of the SPs. In some embodiments, the aqueous solution is stirred (e.g., using a magnetic stirrer) to facilitate the redox reaction.

Expanding further, in particular embodiments, the soluble Pt halide salt can include a chloride salt of Pt. For example, in one embodiment, the Pt halide salt is an aqueous solution of $Na_2PtCl_4$. In such embodiments, the surface of the Ag particles serves as a sacrificial substrate to prompt reduction of the $PtCl_4^-$ ions, as shown in panels (b) and (c) of FIG. 3. Addition of the $Na_2PtCl_4$ aqueous solution initiates the galvanic replacement reaction to form Pt atoms on the surface of the Ag particles and dissolve the Ag particles into $Ag^+$ ions. The resulting Pt atoms condense on the surface of the Ag particles into Pt nano crystals to minimize their surface energy. Simultaneously free $Cl^-$ ions are released form the $PtCl_4^-$ and precipitate with $Ag^+$ generated from the dissolution of the Ag particles when the local solubility product of $Cl^-$ and $Ag^+$ excesses the reaction equilibrium near the Ag particles' surface. Since there is no surfactant in the reaction solution, the resulting AgCl nanocrystals prefer to co-precipitate with the Pt nanocrystals to form Pt—/AgCl composited SPs extending from the surface of Ag particle.

As shown in FIG. 3 panels (b)-(d) the reaction initiates the etching of the Ag particles at the spots with the highest surface energy and the generated Pt atoms nucleate and grow into nanocrystals at the sites with low surface energy (e.g., the positions decorated with dimples in FIG. 3 panel (b)). When more $PtCl_4^{2-}$ ions are added to the reaction solution, the Ag particles are selectively dissolved to form voids and the resulting Pt nanocrystals and AgCl nanocrystals assemble on the surfaces of the Ag nanoparticles to form dome-like bumps (FIG. 3 panels (c) and (d)).

The co-precipitation prevents the Pt nanocrystals from growing into large crystals because the direct contact of AgCl and Pt can significantly interfere with the growth of Pt crystalline lattices. Continuous reaction leads to the enlargement of the Pt/AgCl SPs rather than formation of new SPs on the etched but highly reactive surface of the Ag particles (FIG. 3 panel (c)). It is to be noted that the synthesis of the SPs is independent of the shape or morphology of the Ag particles. In this manner a plurality of hemispherical Pt/AgCl SPs are produced on the surface of the Ag particles (FIG. 3 panel (c)).

The heating is maintained for a predetermined time, at 206. This maintaining allows the Ag particles to be consumed and release the Pt/Ag SPs into the aqueous solution. For example, as shown in FIG. 3 panel (d), the Ag particle undergoes the redox reaction with the $Na_2PtCl_4$ until the Ag particle is completely consumed releasing the Pt/AgCl SPs into the aqueous solution. The Pt/AgCl SPs have hemispherical dome shape with a flat bottom. The heating can be maintained for any suitable time, for example 1 minute, 2 minutes, 4 minutes, 6 minutes, 8 minutes, 10 minutes, 12 minutes, 14 minutes, 16 minutes, 18 minutes or 20 minutes inclusive of all ranges and values therebetween. In some embodiments, the heating is maintained until substantially all the Ag particles are consumed.

The aqueous solution is cooled at 208. The aqueous solution can be cooled in ambient conditions to room temperature.

The Pt/Ag halide SPs are separated from the aqueous solution, at 210. For example, the Pt/Ag halide SPs can be separated from the aqueous solution by centrifuging and then collecting the precipitated fraction. The Pt/Ag halide SPs (e.g., the Pt/AgCl SPs) include halide anions (e.g., Cl$^-$) absorbed on a surface of the Pt/Ag halide SPs. The halide anions produce a negative charge on the surface of the SPs to prevent the Pt/Ag halide SPs (e.g., the Pt/AgCl SPs) from coalescing. In other words, the negative charge produced by the absorbed or adsorbed halide anions repels adjacent Pt/Ag halide SPs (e.g., the Pt/AgCl SPs) from each other preventing them from coalescing.

The adsorbed halide anions (e.g., Cl$^-$ ions) stabilize the Pt/Ag halide SPs (e.g., the Pt/AgCl SPs) in polar solvents (e.g., water, ethanol, etc.) though the surface of the Pt/Ag halide SPs (e.g., the Pt/AgCl SPs) is free of organic ligands. The adsorbed halide ions render the Pt/Ag halide SPs to have a high negative zeta potential (e.g., in the range of $-30$ eV to $-40$ eV). The Pt/Ag halide SPs (e.g., the Pt/AgCl SPs) can also remain stable when stored for extended periods of time, for example up to about 1 year.

The Pt/Ag halide SPs are reduced in an aqueous solution of ammonia to dissolve the Ag halide, at 212. For example, as shown in FIG. 3 panel (f), the Pt/AgCl SPs are incubated in an aqueous solution of ammonia to dissolve the AgCl and yield Pt SPs. The Pt SPs are porous having a hemispherical dome shape with a flat bottom and hollow core. In some embodiments, the aqueous ammonia solution is stirred (e.g., using a magnetic stirrer) to facilitate the reduction reaction.

The Pt SPs prepared using method 200 are free of organic ligands. Thus a larger surface area of the Pt SPs is available for physical and chemical interaction. In some embodiments, the Pt SPs have a zeta potential of lower than $-20$ eV (e.g., in the range of $-20$ eV to $-30$ eV inclusive of all ranges and values therebetween). This highly negative zeta potential allows the Pt SPs to have high stability in solution and prevents the Pt SPs from coalescing. Furthermore, the Pt SPs have a diameter of greater than 20 nm. For example, the Pt SPs can have a diameter in the range of about 20 nm to about 200 nm, inclusive of all ranges and values therebetween. In some embodiments, the size of the Pt SPs can be controlled by varying a concentration of the soluble platinum halide salt (e.g., Na$_2$PtCl$_4$) and a concentration of the colloidal Ag particles in the aqueous solution, as described with respect to method 100.

Figure 4:
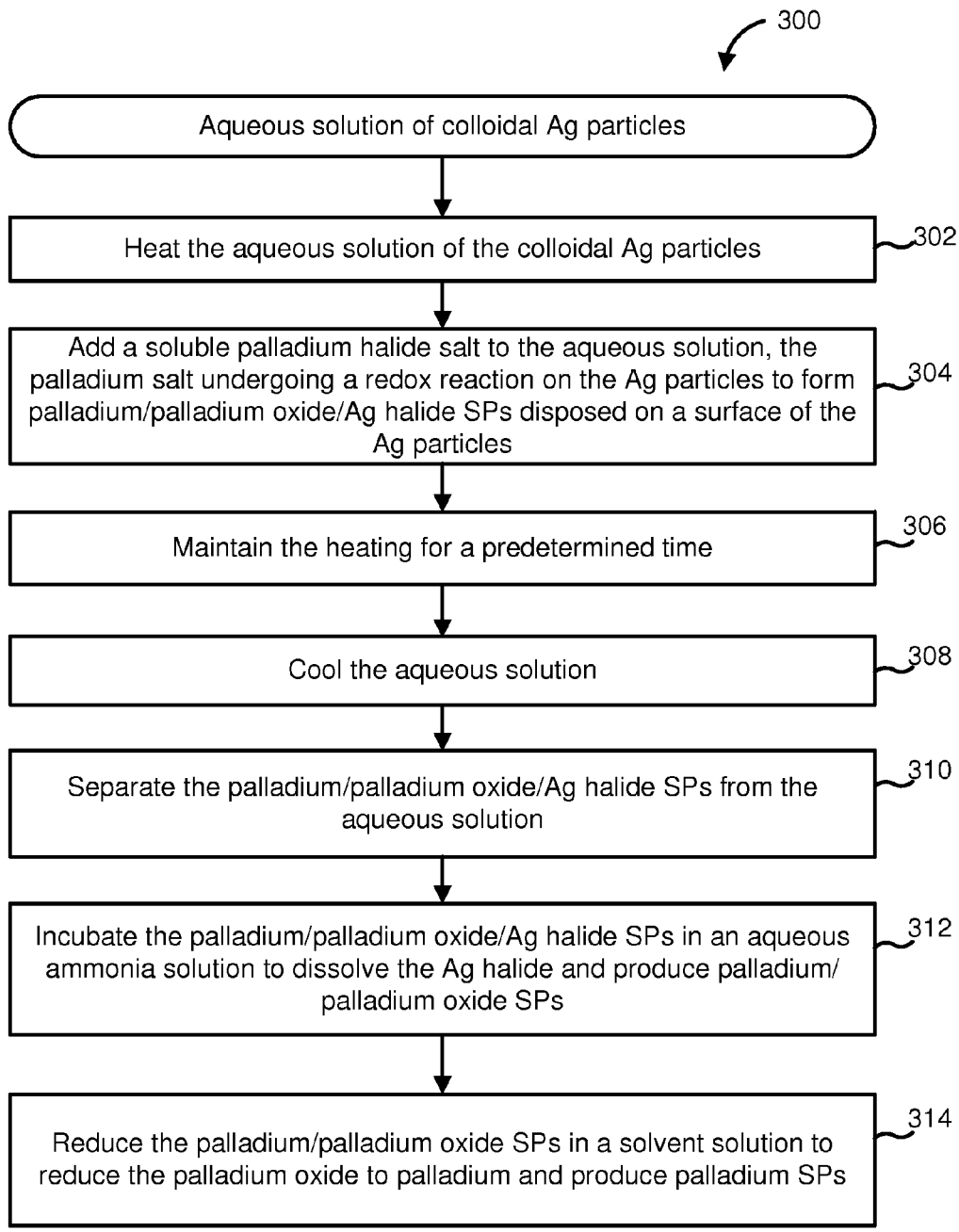
FIG. 4 is a schematic flow diagram of another embodiment of a method of preparing palladium (Pd) SPs.

FIG. 4 is a schematic flow diagram of a method 300 for preparing Pd SPs. The Pd SPs prepared using the method 300 include a plurality of Pd nanoparticles having a chain like morphology.

The method 300 includes heating an aqueous solution of colloidal Ag particles, at 302 as described with respect to the method 100 and 200. The Ag particles are substantially similar to the Ag particles described with respect to the method 100 and 200 and therefore, not described in further detail herein. In particular embodiments, the aqueous solution is stirred (e.g., using a magnetic stirrer) during the heating to prevent the Ag particles from coalescing.

A soluble Pd halide salt is added to the aqueous solution, at 304. The Pd halide salt undergoes a redox reaction on a surface of the Ag particles to form a plurality of Pd/PdO/Ag halide SPs disposed on the surface of the Ag particles. For example, as described before, the portion of the surface of the Ag particles that are absent of the organic ligand thereon can serve as nucleation sites for initiation of the redox reaction and formation of the SPs. In some embodiments, the aqueous solution is stirred (e.g., using a magnetic stirrer) to facilitate the redox reaction.

Expanding further, in particular embodiments, the soluble Pd halide salt can include a chloride salt of Pd. For example, in one embodiment, the soluble Pd halide salt is an aqueous solution of Na$_2$PdCl$_4$. In such embodiments, the surface of the Ag particles serves as a sacrificial substrate to prompt reduction of the PdCl$_4^{2-}$ ions to produce Pd nanocrystals and AgCl nanocrystals. In addition to directly react with Ag particles, PdCl$_4^{2-}$ ions also hydrolyze to form PdO nanocrystals at the reaction temperature (i.e., about 100 degrees Celsius), generating composite SPs consisting of Pd/PdO/AgCl nanocrystals.

The heating is maintained for a predetermined time, at 306. This maintaining allows the Ag particles to be consumed and release the Pd/PdO/Ag halide SPs (e.g., Pd/PdO/AgCl SPs) into the aqueous solution. The heating can be maintained for any suitable time, for example 1 minute, 2 minutes, 4 minutes, 6 minutes, 8 minutes, 10 minutes, 12 minutes, 14 minutes, 16 minutes, 18 minutes or 20 minutes inclusive of all ranges and values therebetween. In some embodiments, the heating is maintained until substantially all the Ag particles are consumed. Existence of PdO in the composite Pd/PdO/AgCl SPs causes the interconnection between each SP to form chain-like structures.

The aqueous solution is cooled, at 308. The aqueous solution can be cooled in ambient conditions to room temperature. For example, a heating source can be removed and the aqueous solution allowed to cool naturally under ambient conditions to room temperature The Pd/PdO/Ag halide SPs are separated from the aqueous solution, at 310. For example, the Pd/PdO/Ag halide SPs can be separated from the aqueous solution by centrifuging and then collecting the precipitated fraction. The Pd/PdO/Ag halide SPs (e.g., the Pd/PdO/AgCl SPs) include halide anions (e.g., Cl$^-$) absorbed on a surface of the Pd/PdO/Ag halide SPs. The halide anions produce a negative charge on the on the surface of the SPs to prevent the Pt/Ag halide SPs (e.g., the Pt/AgCl SPs) from coalescing, as described before herein.

The Pd/PdO/Ag halide SPs are incubated in an aqueous solution of ammonia to dissolve the Ag halide, at 312. For example, the Pd/PdO/AgCl SPs are mixed in an aqueous solution of ammonia to dissolve the AgCl and yield Pd/PdO SPs. In some embodiments, the aqueous ammonia solution is stirred (e.g., using a magnetic stirrer) to facilitate the dissolution of AgCl.

The Pd/PdO SPs are reduced in a solution to reduce the PdO and produce Pd SPs, at 314. The PdO/Pd SPs are collected and then dispersed in a solvent (e.g., an ethanol solution) to reduce the PdO nanocrystals and produce Pd SPs. The dispersing in the solution can include a solvothermal treatment process in which the solvent (e.g., ethanol) is heated to a predetermined temperature. In one embodiment, the solvent can be heated to a temperature of up to about 150 degrees Celsius. In further embodiments, the solvent solution is also stirred (e.g., using a magnetic stirrer) to facilitate the redox reaction. Since no surfactant is used during the method 300, a surface of the Pd SPs is free or organic ligands or otherwise surfactants. Thus a larger surface are of the Pd SPs is available for physical and chemical interaction.

The resulting Pd SPs are porous and have a chainlike morphology. In some embodiments, a trace amount of halide ions (e.g., Cl$^-$ ions) is adsorbed on a surface of the Pd SPs. The adsorbed halide anions (e.g., Cl$^-$) produce a negative charge on the surface of the Pd SPs that repels adjacent Pd SPs and helps stabilize the Pd SPs in polar solvents. In further embodiments, the porous Pd SPs can be crystalline having a face cubic centered (fcc) lattice structure. Furthermore, the Pd SPs have a diameter of greater than 20 nm. For example, the Pd SPs can have a diameter in the range of about 20 nm to about 200 nm, inclusive of all ranges and values therebetween.

Figure 5:
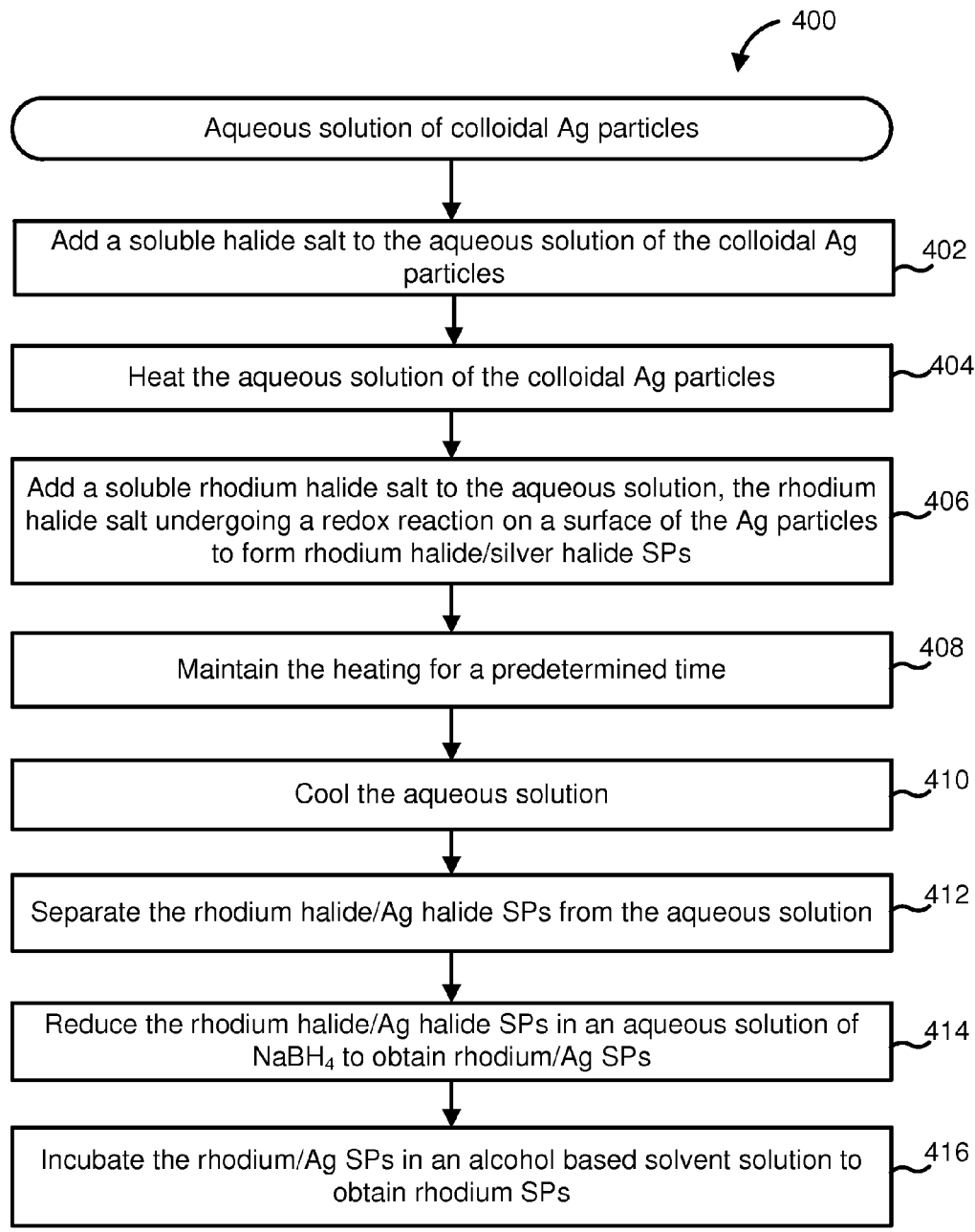
FIG. 5 is a schematic illustration of still another embodiment of a method of preparing rhodium (Rh) SPs and Rh/Ag SPs.

FIG. 5 is a schematic flow diagram of a method 400 for preparing Rh SPs. The Rh SPs prepared using the method 400 include a plurality of Rh nanoparticles arranged in a spherical structure and crystallized in an fcc lattice.

The method 400 includes adding a soluble halide salt to an aqueous solution of colloidal Ag particles, at 402. In some embodiments, the halide salt can include KI. Addition of the halide salt, for example, KI to the aqueous solution can boost the oxidation of Ag particles due to much lower solubility of AgI than AgCl, as described herein.

The aqueous solution of colloidal Ag particles is heated, at 404 as described with respect to the method 100 and 200. The Ag particles are substantially similar to the Ag particles described with respect to method 100, 200 and 300, and therefore not described in further detail herein. In particular embodiments, the aqueous solution is stirred (e.g., using a magnetic stirrer) during the heating to prevent the Ag particles from coalescing.

A soluble Rh halide salt is added to the aqueous solution, at 406. The Rh halide salt undergoes a redox reaction on the surface of the Ag particles to form Rh halide/Ag halide SPs, via nucleation on the Ag particles as described before.

Expanding further, in particular embodiments, the Rh halide salt can include a chloride salt of Rh. For example, in one embodiment, the Rh halide salt includes $Na_3RhCl_6$. In such embodiments, in which KI is added to the aqueous solution, the Ag particles are oxidized by oxygen from ambient air to form AgI. Simultaneously, $RhCl_6^{3-}$ ions are transformed into solid nanocrystals of $RhI_3$ through anion exchange, and co-precipitate with AgI nanocrystals on a surface of the Ag particles, to form $RhI_3$/AgI SPs on the surface of the Ag particles.

The heating is maintained for a predetermined time, at 408. This maintaining allows the Ag particles to be consumed and release the Rh halide/Ag halide SPs (e.g., the $RhI_3$/AgI SPs) into the aqueous solution. The heating can be maintained for any suitable time, for example 1 minute, 2 minutes, 4 minutes, 6 minutes, 8 minutes, 10 minutes, 12 minutes, 14 minutes, 16 minutes, 18 minutes or 20 minutes inclusive of all ranges and values therebetween. In some embodiments, the heating is maintained until substantially all of the Ag particles are consumed.

The aqueous solution is cooled at 410. The aqueous solution can be cooled in ambient conditions to room temperature. For example, a heating source used to heat the aqueous solution can be removed and the aqueous solution allowed to cool naturally in ambient conditions to room temperature.

The Rh halide/Ag halide SPs (e.g., the $RhI_3$/AgI SPs) are separated from the aqueous solution, at 412. For example, the Rh halide/Ag halide SPs (e.g., the $RhI_3$/AgI SPs) can be separated from the aqueous solution by centrifuging and then collecting the precipitated fraction.

The obtained $RhI_3$/AgI SPs can have poor crystallinity. The Rh halide/Ag halide SPs (e.g., the $RhI_3$/AgI SPs) are reduced in an aqueous solution of $NaBH_4$, at 414 to obtain Rh/Ag SPs which have substantially better crystallinity than the Rh halide/Ag halide SPs (e.g., the $RhI_3$/AgI SPs). In some embodiments, the aqueous $NaBH_4$ solution is stirred (e.g., using a magnetic stirrer) to facilitate the reduction reaction.

The Rh/Ag SPs are further annealed in a solvent to reduce the Ag and obtain Rh SPs, at 416. For example, the Rh/Ag SPs are collected and then dispersed in a solvent (e.g., an ethanol solution) to reduce the Ag nanocrystals and produce Rh SPs with increased crystallinity. The dispersing in the solvent solution can include a solvothermal treatment process in which the solvent (e.g., ethanol) is heated to a predetermined temperature. In one embodiment, the solvent can be heated to a temperature higher than its boiling point, for example up to about 150 degrees Celsius. In further embodiments, the solution is stirred (e.g., using a magnetic stirrer) to facilitate the redox reaction. Since no surfactant is used during the method 400, a surface of the Rh SPs is free of organic ligands or otherwise surfactants. Thus a larger surface of the Rh SPs is available for physical and chemical interaction.

The resulting Rh SPs are porous and are crystallized in a fcc lattice and contain only trace amounts of Ag and the halogen (e.g., $I^-$). In some embodiments, a trace amount of halide anions (e.g., $I^-$ ions) are adsorbed on a surface of the Rh SPs. The adsorbed halide anions (e.g., $Cl^-$) produce a negative charge on the surface of the Rh SPs that repels adjacent Rh SPs and helps stabilize the Rh SPs in polar solvents. Furthermore, the Rh SPs have a diameter of greater than 20 nm. For example, the Rh SPs can have a diameter in the range of about 20 nm to about 200 nm, inclusive of all ranges and values therebetween.

Figure 6:
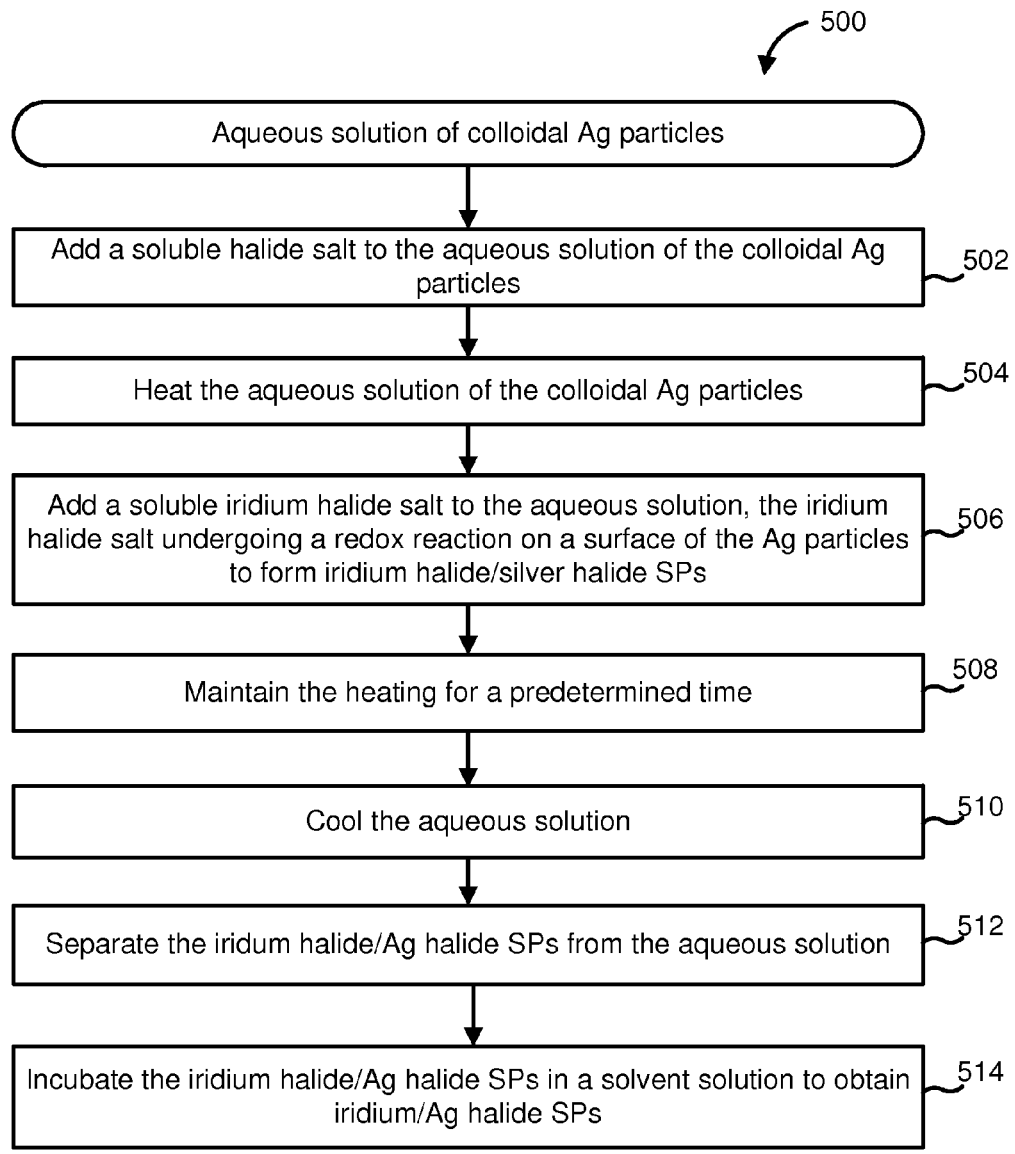
FIG. 6 is a schematic illustration of yet another embodiment of a method of preparing iridium (Ir)/Ag halide SPs.

FIG. 6 is a schematic flow diagram of a method 500 for preparing Ir/Ag halide SPs. The Ir/Ag halide SPs prepared using the method 500 include Ir nanocrystals which are attached to the Ag halide nanocrystals arranged in a dendritic structure.

The method 500 includes adding a soluble halide salt to an aqueous solution of colloidal Ag particles, at 502. In some embodiments, the halide salt can include KI. Addition of the halide salt, for example, KI to the aqueous solution can boost the oxidation of Ag particles due to much lower solubility of AgI than AgCl, as described herein.

The aqueous solution of colloidal Ag particles is heated, at 504 as described with respect to the method 100 and 200. The Ag particles are substantially similar to the Ag particles described with respect to method 100, 200, 300 and 400 and therefore, not described in further detail herein. In particular embodiments, the aqueous solution is stirred (e.g., using a magnetic stirrer) during the heating to prevent the Ag particles from coalescing.

A soluble Ir halide salt is added to the aqueous solution, at 506. The Ir halide salt undergoes a redox reaction on the surface of the Ag particles to form Ir halide/Ag halide SPs, on the nucleation sites of the Ag particles.

Expanding further, in particular embodiments, the soluble Ir halide salt can include a chloride salt of Ir. For example, in one embodiment, the soluble Ir halide salt includes $Na_3IrCl_6$. In such embodiments, in which KI is added to the aqueous solution, the Ag particles are oxidized by oxygen from ambient air to form AgI. Simultaneously, $IrCl_6^{3-}$ ions are transformed into solid nanocrystals of $IrI_3$ through anion exchange, and co-precipitate with AgI nanocrystals on a surface of the Ag particles to form $IrI_3$/AgI SPs on the surface of the Ag particles.

The heating is maintained for a predetermined time, at 508. This maintaining allows the Ag particles to be consumed and release the Ir halide/Ag halide SPs (e.g., the $IrI_3$/AgI SPs) into the aqueous solution. The heating can be maintained for any suitable time, for example 1 minute, 2 minutes, 4 minutes, 6 minutes, 8 minutes, 10 minutes, 12 minutes, 14 minutes, 16 minutes, 18 minutes or 20 minutes inclusive of all ranges and values therebetween. In some embodiments, the heating is maintained until substantially all of the Ag particles are consumed.

The aqueous solution is cooled, at 510. The aqueous solution can be cooled in ambient conditions to room temperature. For example, a heating source used to heat the aqueous solution is removed and the aqueous solution is allowed under ambient conditions to room temperature.

The Ir halide/Ag halide SPs (e.g., the $IrI_3$/AgI SPs) are separated from the aqueous solution, at 512. For example, the Ir halide/Ag halide SPs (e.g., the $IrI_3$/AgI SPs) can be separated from the aqueous solution by precipitation and then centrifuging the supernatant to collect the precipitated fraction.

The Ir halide/Ag halide SPs are incubate and chemically reduced in a solvent solution to obtain Ir/Ag halide SPs, at 514. For example, the Ir halide/Ag halide SPs (e.g., the $IrI_3$/AgI SPs) are collected and then dispersed in a solvent solution (e.g., an ethanol solution) to reduce the Ir halide (e.g., $IrI_3$) nanocrystals and produce Ir/Ag halide (e.g., Ir/AgI) SPs. The dispersing in the solvent solution can include a solvothermal treatment process in which the solvent (e.g., ethanol) is heated to a predetermined temperature. In one embodiment, the solvent can be heated to a temperature higher than its boiling point, for example up to about 150 degrees Celsius. In further embodiments, the solvent solution is stirred (e.g., using a magnetic stirrer) to facilitate the reaction. Since no surfactant is used during the method 500, a surface of the Ir/Ag halide (e.g., Ir/AgI) SPs is free of organic ligands or otherwise surfactants. Thus a larger surface are of the Ir/Ag halide (e.g., Ir/AgI) SPs is available for physical and chemical interaction.

The resulting Ir/Ag halide (e.g., Ir/AgI) SPs are porous and include Ir nanocrystals supported by Ag halide (e.g., AgI) nanocrystals. The Ag halide (e.g., AgI) nanocrystals help to stabilize the Ir nanocrystals to form the SPs which otherwise would be too scattered to assemble into the SPs. Furthermore, the Ir/Ag halide SPs have a diameter of greater than 20 nm. For example, the Ir/Ag halide SPs can have a diameter in the range of 20 nm to 200 nm, inclusive of all ranges and values therebetween.

Thus the method 100, 200, 300, 400, 500 and any other method described herein can be used to produce noble metal SPs whose surface is free of organic ligands, but still have a sufficient zeta potential which provides the noble metal SPs great stability in polar solvents and prevents the noble metal SPs from coalescing. These noble metal SPs therefore have a much higher surface-to-volume ratio and are suitable candidates for high catalytic efficiency catalysts. These advantages are beneficial for improving the performance in applications such as catalysis in comparison with conventional nanocrystals coated with surfactant capping layers.

In some embodiments, a catalyst includes a plurality of noble metal SPs. Each of the plurality of noble metal SPs include a plurality of noble metal nanoparticles arranged in a three-dimensional structure. A surface of the noble metal SPs is free of organic ligands and the noble metal SPs have a zeta potential sufficient to prevent the noble metal SPs from coalescing.

In various embodiments, the noble metal is selected from the group consisting of Pt, Pd, Rh and Ir. For example, in one embodiment, the noble metal is Pt and the noble metal SPs include a plurality of Pt nanoparticles arranged in a structure having a hemispherical dome shape with a flat base, a hollow core and a plurality of pores defined between the Pt nanoparticles. In such embodiments, the Pt SPs can have a negative zeta potential of lower than −20 eV (e.g., in the range of −20 eV to −30 eV). Furthermore, the Pt SPs can have a catalytic conversion efficiency of greater than 80%. The Pt SPs can be prepared using the method 100, 200 or any other method described herein.

In other embodiments, the noble metal is Pd and the noble metal SPs include porous Pd SPs having a fcc lattice and arranged in an chain-like configuration. The Pd SPs can be prepared using the method 100, 300 or any other method described herein.

In still other embodiments, the noble metal is Rh and the noble metal SPs include porous Rh SPs having a fcc lattice arranged in a spherical structure. The Rh SPs can be prepared used the method 100, 400 or any other method described herein.

In yet other embodiments, the noble metal is Ir and the noble metal SPs include Ir/AgI SPs having Ir nanoparticles interspersed or otherwise supported by AgI nanoparticles and forming a dendritic structure. The Ir/AgI SPs can be prepared using the method 100, 500 or any other method described herein.

EXPERIMENTAL EXAMPLES

Preparation and Characterization of Pt/AgCl SPs and Pt SPs

Figure 7:
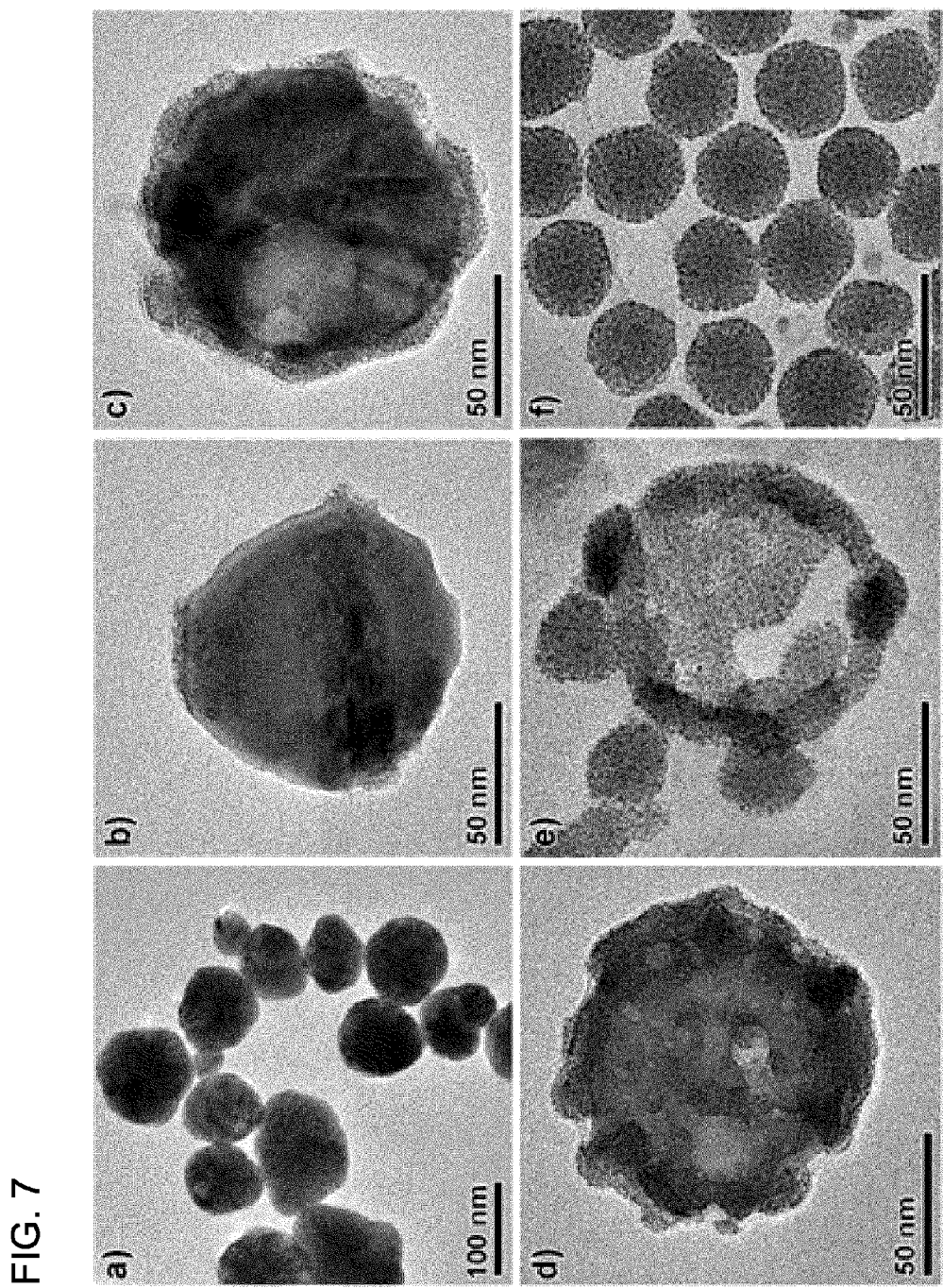
FIG. 7 panels (a) to (e) are transmission electron microscopy (TEM) images showing the evolution of composite Pt/AgCl SPs; panel (a) shows the starting colloidal Ag particle substrates; panel b) shows initial deposition of Pt nanocrystals on the surface of Ag colloidal substrate as nuclei; panels (c) and (d) show continued deposition of Pt and AgCl nanocrystals upon the addition of $PtCl_4^{2-}$, forming composited islands on the surface of Ag; panel (e) shows matured composite Pt/AgCl SPs after falling from the collapsed Ag particle hollow shells; and panel (f) shows freestanding composite Pt/AgCl SPs.

FIG. 7 panels (a) to (f) are TEM images at various stages of synthesis of Pt/AgCl SPs. The Pt SPs are synthesized using an embodiment of the method 200. FIG. 7 panel (a) shows a TEM image of the starting colloidal Ag particles. The colloidal Ag particles with irregular shapes are prepared through the room-temperature reduction of $AgNO_3$ by ascorbic acid in deionized (DI) water containing acetonitrile. In a typical process, DI water (16 mL) is first mixed with acetonitrile (4 mL). Next, aqueous solutions of sodium citrate tribasic dihydrate (4 mL, 0.1 M) and ascorbic acid (1.6 mL, 0.1 M) are added successively. Later, an aqueous solution of silver nitrate (4 mL, 0.01 M) is injected. This process is performed at room temperature and magnetic stirring is maintained throughout the whole process. Reaction for 40 minutes results in the formation of irregular shaped Ag colloidal nanoparticles with broad size distributions ranging from about 50 nm to about 200 nm. The Ag colloidal nanoparticles are then washed with water for two times and redispersed in water (32 mL). The solution of Ag nanoparticles is used as the precursor materials for synthesizing colloidal noble metal SPs.

Since the starting Ag particles (FIG. 7 panel (a)) are synthesized with small and weakly adhering surfactant molecules (e.g., acetonitrile and citrates), the surfactant molecules do not strongly bond to the Ag surfaces. Washing the Ag particles for several times allows partial removal of the surfactant molecules adsorbed on the particles, leaving non-uniformly covered Ag surfaces to react with $PtCl_4^{2-}$ ions.

A glass vial (20 mL) containing the aqueous solution of Ag colloidal nanoparticle solution (4 mL) and DI water (6 mL) is first heated to boiling by a heating plate. The light grey aqueous dispersion turned light pale grey. The aqueous solution of $Na_2PtCl_4$ (0.01 M) is then added drop wise at an addition rate of 10 μL/s while the dispersion is kept boiling. During the addition, a light brown color is gradually produced, indicating the formation of colloidal Pt/AgCl superparticles. FIG. 7 panel (b) shows initial deposition of Pt nanocrystals on the surface of the Ag particles.

After adding a predetermined amount of $Na_2PtCl_4$, the dispersion is left to heat for another 10 minutes until a brown color formed. FIG. 7 panels (c) and (d) shows the continued deposition of Pt nanocrystals and AgCl nanocrystals on the surface of the Ag particles, forming composited islands, which resemble dome like bumps on the surface of the Ag particles. These nano-islands are made of nanocrystals having an average size of about 3 nm.

For 34.1 nm colloidal Pt/AgCl superparticles with a size of about 45 nm, about 1,400 μL of $Na_2PtCl_4$ (0.01 M) aqueous solution is added. The continued deposition gradually consumes the Ag particles. As seen in FIG. 7 panel (e) the number of holes inside the Ag particles increases which enlarge and merge together until matured composited Pt/AgCl SPs fall from the collapsed hollow shells of the Ag particles and form free standing Pt/AgCl SPs (FIG. 7 panel (f)).

The Pt/AgCl SP dispersion is later removed from heat, allowed to cool and stay undisturbed for about 30 minutes. Finally the light brown supernatant is collected, yielding a solution of Pt/AgCl superparticles.

Figure 8:
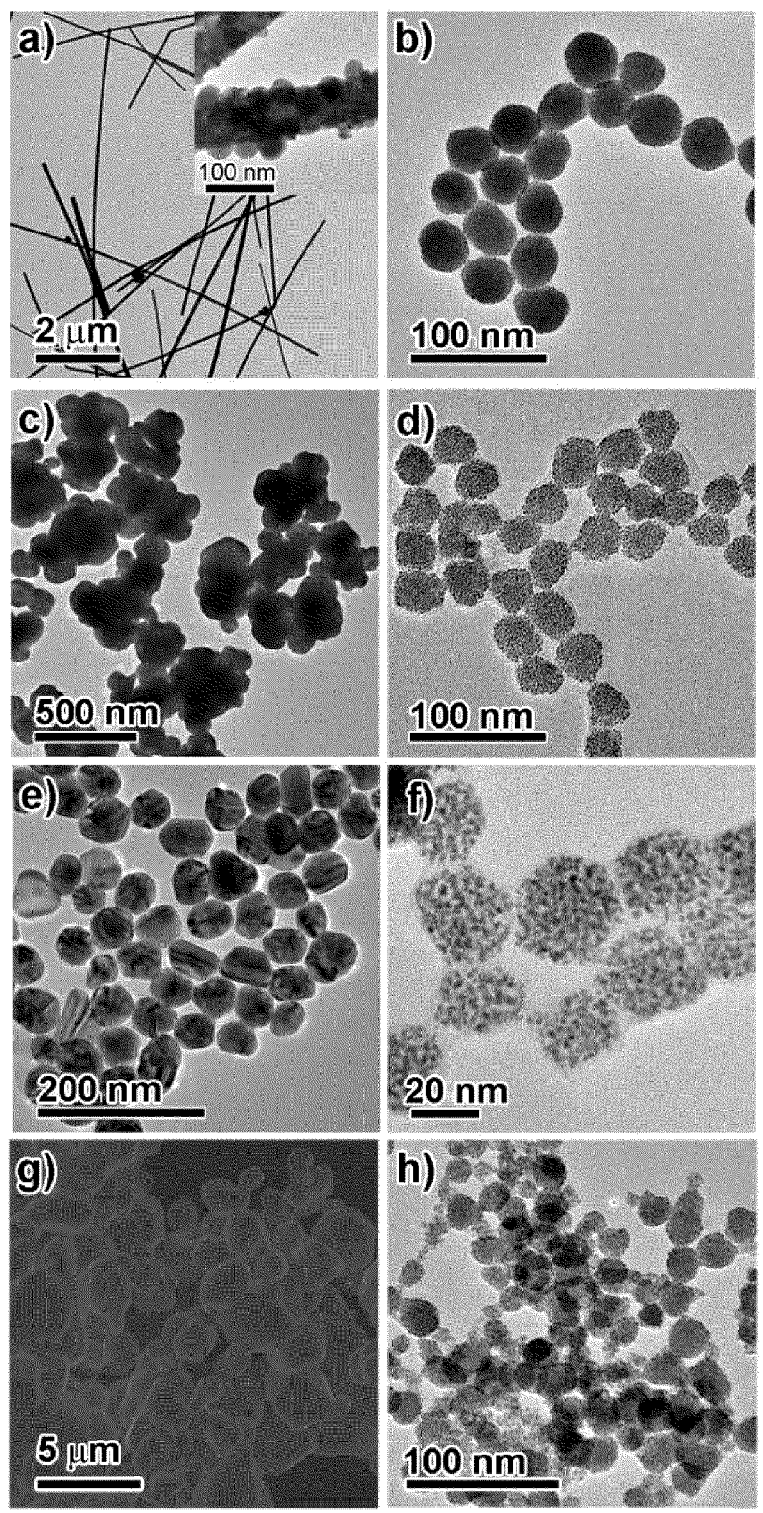
FIG. 8 panels (a) to (h) are TEM images of various Ag particles that can be used for synthesizing noble metal SPs and Pt/AgCl SPs formed therefrom; panel (a) shows Ag nanowires and panel (b) shows Pt/AgCl SPs forming thereon; panel (c) shows irregular Ag aggregated particles and panel (d) shows Pt/AgCl SPs forming thereon; panel (e) shows gold (Au) core/Ag shell nanoparticles and panel (f) shows Pt/AgCl SPs forming thereon; panel (g) shows commercial Ag microparticles and panel (h) shows Pt/AgCl SPs forming thereon.

While the Pt/AgCl SPs shown in FIG. 7 are synthesized on spherical Ag particles, Ag particles of any shape and size can be used as substrates for synthesizing the Pt/AgCl SPs or any other SPs described herein. For example, FIG. 8 panels (a) to (h) are TEM images of various shaped Ag particles and Pt/AgCl SPs deposited thereon. FIG. 8 panel (a) shows Ag nanowires and inset shows Pt/AgCl SPs growing on the Ag nanowires before falling off. FIG. 8 panel (b) shows freestanding Pt/AgCl SPs obtained using the Ag nanowires. Similarly, FIG. 8 panel (c) shows irregular Ag aggregated particles, panel (e) Au core/Ag shell particles, panel (g) Ag microparticles, while panels (d), (f) and (h) show freestanding Pt/AgCl SPs formed using each of these Ag substrates, respectively. Although, the Pt/AgCl SPs obtained using each of these Ag particles are different in size, they are similarly made of small nanocrystals, similar to the Pt/AgCl SPs of FIG. 7.

Figure 9:
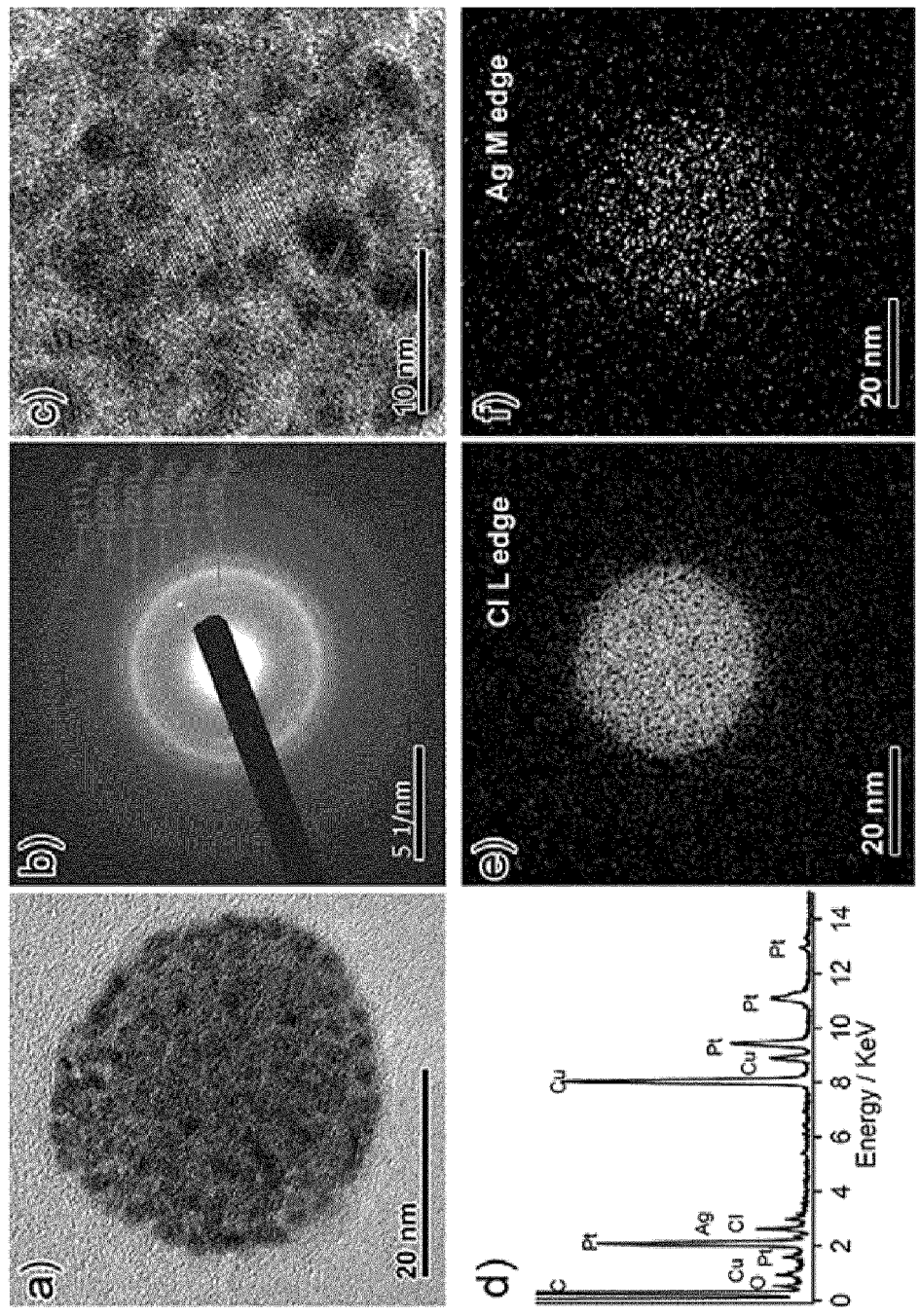
FIG. 9 panel (a) is a TEM image of a single Pt/AgCl SP with diameter of about 32 nm; panel (b) is a selected area electron diffraction (SAED) pattern of Pt/AgCl SPs; panel (c) is a high-resolution TEM (HRTEM) image of a composite Pt/AgCl SP which shows the typical lattices of Pt and AgCl nanocrystals; panel (d) is a plot of energy dispersive x-ray spectroscopy (EDS) analysis of the composite SPs; panels (e) and (f) are energy-filtered transmission electron microscopy (EFTEM) image of a composite Pt/AgCl SP corresponding to (a), which are mapped by using Cl L-edge (200 eV) and Ag M-edge (450 eV), respectively.

FIG. 9 panel (a) is a typical TEM image of a single Pt/AgCl SP obtained using the method described with respect to FIG. 7. The Pt/AgCl SP has a diameter of about 32 nm and includes uniform Pt nanocrystals having an average diameter of about 3 nm.

FIG. 9 panel (b) shows a selected electron area diffraction (SAED) pattern of the Pt/AgCl SP. The SAED pattern can be indexed to two sets of diffraction patterns corresponding to Pt nanocrystals and AgCl nanocrystals. The set of broad rings originate from reflections of the (111), (200), (220), (311) lattices in face-centered cubic (fcc) Pt, indicating small dimension and random orientations of the Pt nanocrystals in individual SPs. The other set of weak rings decorated with scattered bright spots are consistent with the (200) and (220) reflections of fcc AgCl lattices.

FIG. 9 panel (c) is a corresponding HRTEM image of the Pt/AgCl SP which reveals that the nanocrystals with dark imaging contrast are made of Pt and the rest nanocrystals with weak imaging contrast are made of AgCl. The 2D lattice identified for Pt is typical for the {111} planes of the Pt, and the lattice of the {111} planes for cubic AgCl nanocrystals. The average d-spacings for the {111} Pt planes are 0.227 nm, and 0.321 nm for the AgCl nanocrystals, both of which match well with those from crystallographic databases for the corresponding material's lattice parameters.

FIG. 9 panel (d) is an energy dispersive x-ray spectra (EDS) of the Pt/AgCl SP. Signals corresponding to Cu, C and O can be attributed to the TEM grid used for imaging. The EDS spectrum shows that the as-synthesized SPs are composed of Pt, Ag, and Cl with atomic concentrations of 51.4%, 10.8%, and 37.8%, respectively. The atomic ratio of Cl to Ag is significantly larger than the stoichiometric ratio in AgCl crystals, implying that excessive $Cl^-$ ions are adsorbed on the SPs.

FIG. 9 panels (e) and (f) are energy-filtered transmission electron microscopy (EFTEM) image of the Pt/AgCl SP shown in (a) mapped by using Cl L-edge (200 eV) and Ag M-edge (450 eV). These images illustrate the distribution of Ag and Cl in a single composite SP. The bright areas in panel (e) correspond to Cl and the bright areas in panel (f) correspond to Ag. This indicates that crystalline AgCl fills the spaces around the Pt nanocrystals in the Pt/AgCl SP. The much stronger intensity of Cl signal than that of Ag can be attributed to the existence of high concentration of adsorbed $Cl^-$ ions on the SP. The adsorbed $Cl^-$ ions stabilize the composite Pt/AgCl SPs in polar solvents (e.g., water, ethanol, etc.) though no organic surfactant molecules are used in the synthesis and the surface of the Pt/AgCl SPs is free of organic ligands. The surface $Cl^-$ anions render the SPs to be highly negatively charged with a zeta potential between −30 eV and −40 eV. Such negative charges prevent the Pt/AgCl SPs from coalescing, resulting in an increased stability and dispersibility in polar solvents. No obvious particle aggregation is observed when an aqueous dispersion of the Pt/AgCl SPs is stocked for more than nine months at room temperature.

Figure 10:
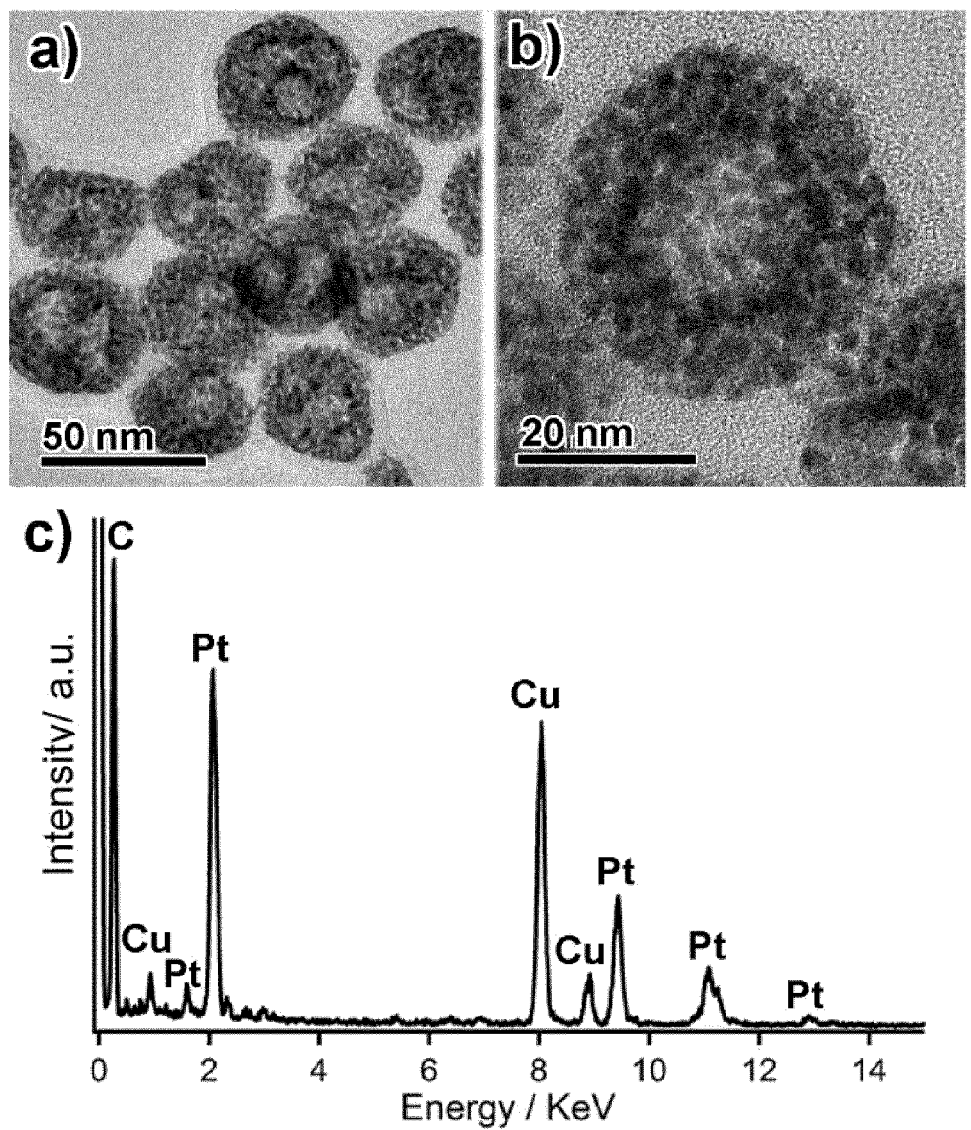
FIG. 10 panel (a) is a representative TEM image of porous Pt SPs obtained after etching with ammonium solution; panel (b) is an enlarged TEM image of a single porous Pt SP made of small Pt nanocrystals with sizes of about 3 nm; and panel (c) is an energy dispersive x-ray spectroscopy (EDS) analysis of the porous Pt SPs showing that the SPs are purely made of Pt.

Porous Pt SPs with exposed surfaces of Pt nanocrystals can be generated by dissolving the AgCl in an aqueous ammonia solution, as described with respect to the method 100 and 200. The small voids left by dissolving AgCl nanocrystals may coalescence into larger voids, forming porous Pt SPs with hollow interiors. FIG. 10 panel (a) is a representative TEM image of Pt SPs obtained after etching AgCl from the Pt/AgCl SPs obtained using the method of FIG. 7 in the aqueous ammonia solution, and FIG. 10 panel (b) is an enlarged TEM image of a single porous Pt SP.

Expanding further, the Pt/AgCl SPs obtained using the method described with respect to FIG. 7 are collected by centrifuging for about 10 minutes at 13,000 revolutions per minute (rpm). The precipitated fraction is then redispersed in 1.5 mL of an aqueous ammonia solution ($NH_3.H_2O$) and sonicated until a homogeneous mixture is formed. The mixture is later vortexed for 2 hours to ensure the dissolution of AgCl included in the original Pt/AgCl SPs. The color of the dispersion turns to lighter pale brown gradually, indicating the removal of AgCl. The resulting porous Pt superparticles are collected by centrifugation, washed with DI water 3 times and finally dispersed in 2 mL DI water.

The resulting Pt SPs are made of small Pt nanoparticles having an average diameter of about 3 nm and have an average diameter of greater than 20 nm (e.g. in the range of 30 nm to 40 nm). Thus, the Pt SPs retain the size and morphology of the corresponding Pt/AgCl SPs.

Furthermore, since no organic surfactant is used throughout the method, a surface of the Pt SPs is free of organic ligands. EDS spectra of the Pt SPs shown in FIG. 10 panel (c) shows that the porous Pt are purely made of Pt. The porous Pt SPs also exhibit high stability in the polar solvents and the zeta potential is measured to be lower than −20 eV (e.g., in the range of −20 eV to −30 eV).

Figure 11:
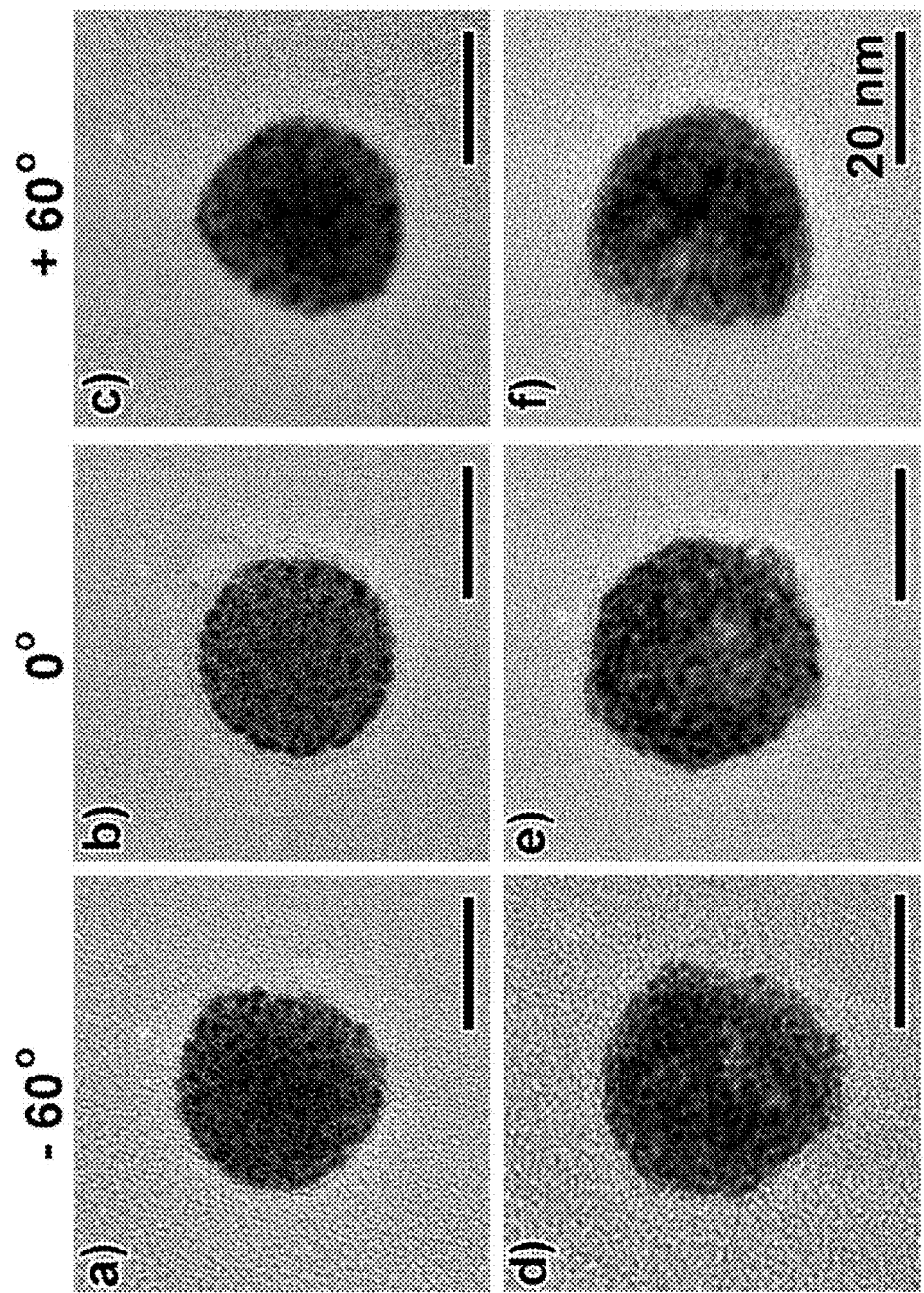
FIG. 11 panels (a) to (f) are tilted TEM images of a single composite Pt/AgCl SP and a porous Pt SP; panels (a) to (c) are TEM images of a single composite Pt/AgCl SP tilted from −60 degrees to +60 degrees, respectively; and panels (d) to (f) are a tilted series of TEM images of a porous Pt SP from −60 degrees to +60 degrees, respectively.

The Pt/AgCl SPs have a hemispherical dome shape having a flat bottom. FIG. 11 panels (a) to (c) show TEM images of a Pt/AgCl SP at various tilt angles to determine the morphology of the Pt/AgCl SP. FIG. 11 panels (a) to (c) are tilted TEM images of a single composite Pt/AgCl SP at a tilt angle of −60 degrees, 0 degrees (no tilt) and +60 degrees, respectively. Tilting the Pt/AgCl SP which sits on its flat bottom by the maximum tilt angle of −60 degrees clearly shows the hemispherical shape with a flatter edge on the right (panel (a)). When the beam is tilted back to 0 degrees, the asymmetric Pt/AgCl SP exhibits nearly perfect spherical shape (panel (b)). The sample is then tilted in the opposite direction to +60 degrees and a mirrored image is displayed with the flat edge on the left (panel (c)). The asymmetric Pt/AgCl SP profiles further proves that the Pt/AgCl SPs are originally generated on the surface of the Ag particles rather than in the solutions, which exhibit flat portion of surface while the rest portion of the surface adopts spherical shape.

The porous Pt SPs obtained from the Pt/AgCl SPs also have a hemispherical dome shape with a flat bottom, and a hollow interior. FIG. 11 panels (d) to (f) present a series of TEM images of a porous Pt SP at a tilt angle of −60 degrees, 0 degrees (no tilt) and +60 degrees, which indicate that the morphology of the Pt SP has not changed too much after etching of AgCl when compared to the composite Pt/AgCl SP. The holes in the porous Pt SP at −60 degrees (panel (d)) are identical and mirrored to that in the image at +60 degrees (panel (f)), which can be used as a reference to demonstrate that the Pt SPs possess hemispherical shape.

Controlling the Size of Pt/AgCl SPs and Pt SPs

The size of the SPs described herein can be controlled by varying the concentration or volumes of the soluble noble metal halide salts and/or colloidal Ag particles used in the methods described herein. For example, the Pt/AgCl SPs, and thereby the Pt SPs formed therefrom, can be controlled by varying the concentration or total volume of $Na_2PtCl_4$ solution and/or changing the concentration or otherwise volume of the aqueous solution of colloidal Ag particles.

Figure 12:
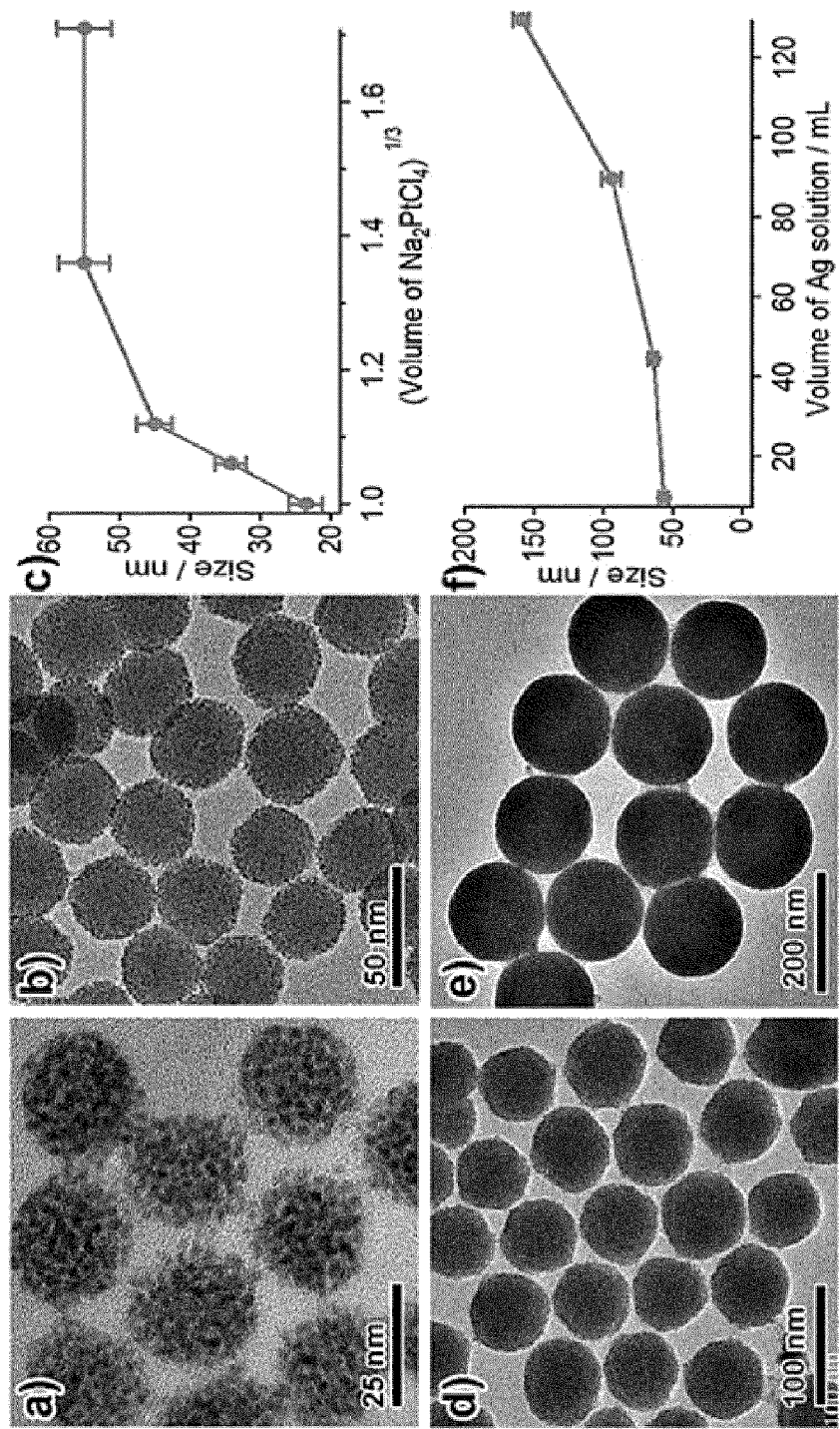
FIG. 12 panel (a) is a TEM image of Pt/AgCl SPs with a diameter of 23.5 nm and panel (b) is a TEM image of Pt/AgCl SPs with a diameter of 45 nm prepared using 1 mL and 1.4 mL of $Na_2PtCl_4$ precursor solution; panel (c) is a plot of the relationship between the sizes and the volume of the $Na_2PtCl_4$ precursor solution based on statistical analysis results; panel (d) is TEM image of Pt/AgCl SPs with a diameter of 63 nm and panel (e) is a TEM image of Pt/AgCl SPs with a diameter of 157 nm prepared using 45 mL and 130 mL of colloidal Ag particles aqueous solution, respectively; panel (f) is a plot that summarizes the relationship between the sizes and the volume of the starting Ag solution by the statistical analysis.

FIG. 12 panel (a) and panel (b) present typical TEM images of two different SP samples synthesized with 1 mL and 1.4 mL of 0.01 M $Na_2PtCl_4$ solution, respectively. FIG. 12 panel (c) summarizes the relationship between the size of the SPs and the volume of $Na_2PtCl_4$ solution used in the synthesis. The size of the SPs is always greater than 20 nm as smaller SPs are not stable enough to fall off from the Ag colloidal substrate. As shown in panel (c), controlling the volume of $Na_2PtCl_4$ solution allows increasing the size of the Pt/AgCl SPs up to 55 nm as the galvanic reaction stops once the colloidal Ag substrates are consumed up regardless of the amount of $Na_2PtCl_4$ added to the reaction solution. The limitation can be overcome by changing the starting volume of the colloidal Ag substrates while keeping the concentration and injection rate of the $Na_2PtCl_4$ solution constant. As a result, the actual concentration of $Na_2PtCl_4$ in the reaction solution at the initial nucleation stage can be further lowered if a larger volume of colloidal Ag substrates is used, leading to the formation of a lower concentration of nuclei and thus larger SPs.

FIG. 12 panels (d) and (e) are TEM images of SPs with sizes of 62 nm and 157 nm synthesized by using 45 mL and 128 mL dispersion of the Ag particles, respectively. The dependence of the size of SPs on the initial volume of Ag particle dispersion is plotted in FIG. 12 panel (f), showing that larger SPs can be achieved with the larger volume of Ag colloidal dispersion. Regardless of their sizes, the as synthesized Pt/AgCl SPs exhibit narrow size distributions which can be attributed to the well-separated nucleation and growth process associated with the slow injection of $Na_2PtCl_4$ solution (at a rate of 10 μL/s). In contrast, interconnected fractal structures are produced if the $Na_2PtCl_4$ precursor solution is quickly added to the dispersion of colloidal Ag particles. Therefore, the size of composite Pt/AgCl SPs (as well as the corresponding porous Pt SPs) can be easily tuned over a broad range by carefully controlling the volumes of either $Na_2PtCl_4$ solution or Ag particle dispersion.

Figure 13:
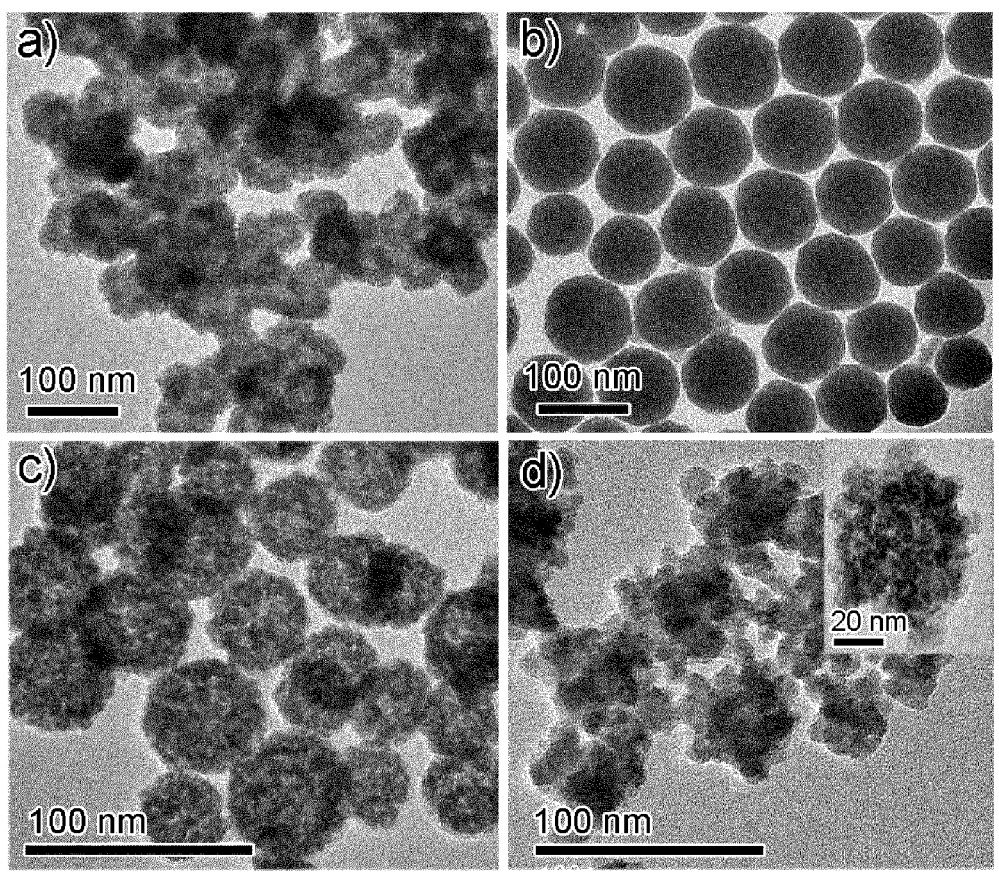
FIG. 13 panels (a) to (d) are representative TEM images of various porous SPs made of Pt-group metals; panel (a) is a TEM image of porous Pd SPs; panel (b) is a TEM image of amorphous $RhI_3$/AgI composite nanospheres; panel (c) is a TEM image of porous Rh SPs obtained after post treatments to the amorphous $RhI_3$/AgI nanospheres; and panel (d) is a TEM image of composite $IrI_3$/AgI composite SPs; inset in (d) shows a typical composite SP composed of Ir nanocrystals and AgI nanocrystals after a solvothermal treatment with ethanol to reduce the $IrI_3$ to Ir (0).

Similar approaches with variations as described with respect to method 100, 300, 400, and 500 can be used to obtain SPs that include other Pt group metals such as Pd, Rh and Ir. FIG. 13 panels (a) to (d) are representative TEM images of various porous SPs made of Pt-group metals. Panel (a) is a TEM image of porous Pd SPs with slight aggregated morphologies. Panel (b) is a TEM image of amorphous $RhI_3$/AgI composite nanospheres. Panel (c) is a TEM image of porous Rh SPs obtained after post treatments (as described in method 100 and 400) to the amorphous $RhI_3$/AgI nanospheres. Panel (d) is a TEM image of $IrI_3$/AgI composite SPs. Inset in (d) shows a typical composite Ir/AgI SP composed of Ir nanocrystals and AgI nanocrystals after a hydrothermal treatment with ethanol to reduce the $IrI_3$ to Ir (0).

Preparation and Characterization of Pd/PdO/AgCl SPs and Pd SPs

Figure 14:
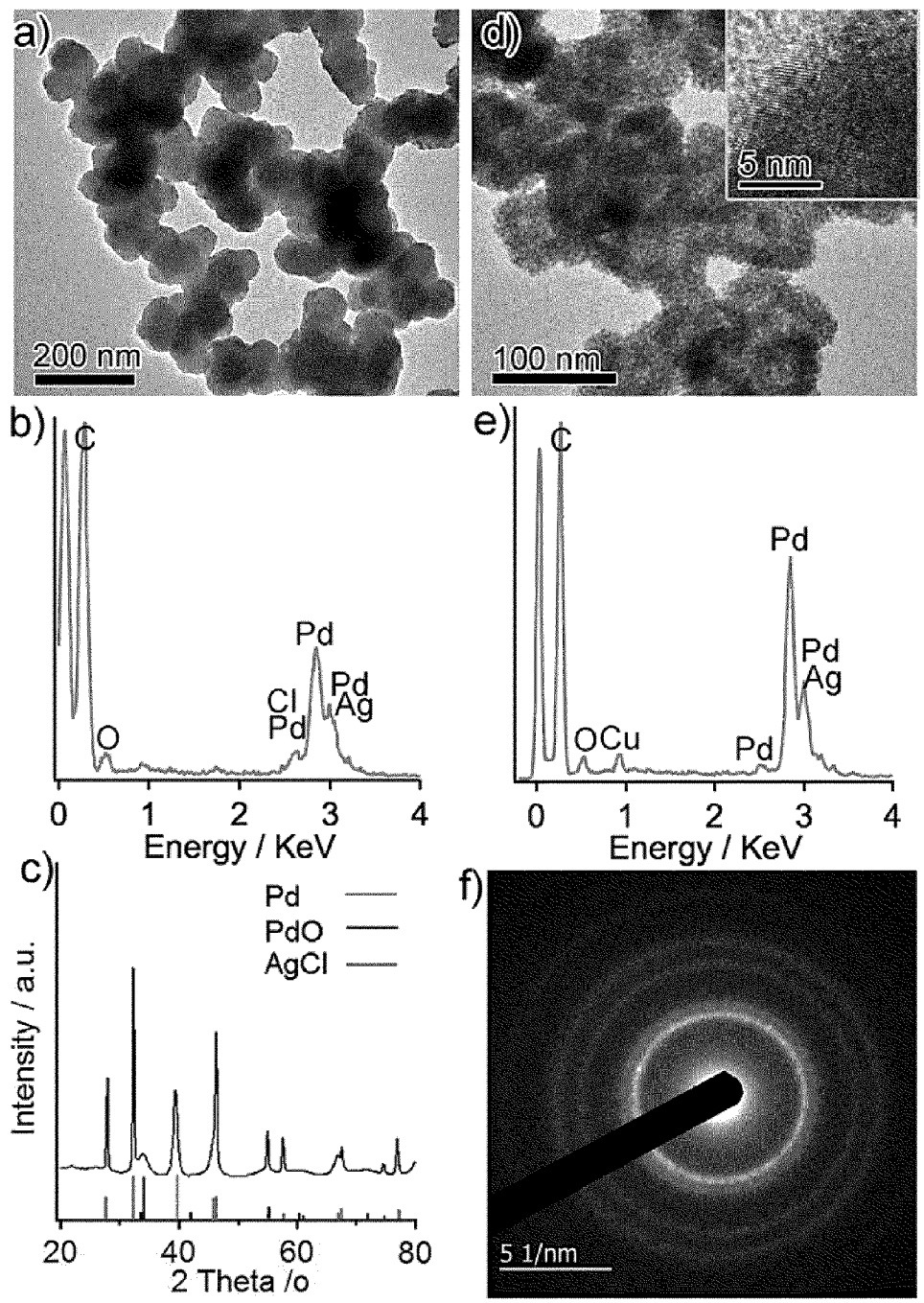
FIG. 14 panel (a) is a representative TEM image of the Pd/palladium oxide (PdO)/AgCl SPs; panel (b) is an EDS spectrum of the composite Pd/PdO/AgCl SPs; panel (c) is a representative XRD pattern of the composited Pd/PdO/AgCl SPs with all peaks indexed to Pd, PdO, and AgCl; panel (d) is a representative TEM image of the slightly aggregated Pd SPs showing the porous structures; panel (e) is an EDS spectrum that indicates the pure composition of Pd with 98 atom % and traces amount of Cl; and panel (f) is corresponding SAED pattern of porous Pd SPs.

FIG. 14 panel (a) is a representative TEM image of Pd/PdO/AgCl SPs. The Pd/PdO/AgCl SPs are obtained using a variation of the method 300. A colloidal Ag aqueous solution is heated to boiling and $Na_2PdCl_4$ solution is added to boiling aqueous solution. In addition to directly react with Ag particles, $PdCl_4^{2-}$ ions also hydrolyze to form PdO nanocrystals at the reaction temperature (i.e., about 100 degrees Celsius), generating composite SPs consisting of Pd nanocrystals, AgCl nanocrystals, and PdO nanocrystals. Existence of PdO in the composite SPs causes the interconnection between each SP to form chain-like structures as shown in FIG. 14 panel (a). FIG. 14 panel (b) is an EDS spectrum of the composite Pd/PdO/AgCl SPs which shows that they include Pd, Ag, Cl and O. FIG. 14 panel (c) is a representative XRD pattern of the composite Pd/PdO/AgCl SPs with all peaks indexed to Pd, PdO, and AgCl.

In order to convert the composite SPs to porous Pd SPs shown in FIG. 14 panel (d), the Pd/PdO/AgCl SPs are soaked in an aqueous solution of ammonium to dissolve the AgCl nanocrystals. The following solvothermal treatment in ethanol at 150 degrees Celsius and a pressure of 41 psi can further reduce PdO to nanocrystalline Pd. FIG. 14 panel (d) is a representative TEM image of the slightly aggregated Pd SPs showing the porous structures. The resulting porous Pd SPs maintain the chainlike morphology of the Pd/PdO/AgCl SPs.

FIG. 14 panel (e) is an EDS spectrum of the Pd SPs that indicates that the Pd SPs include with 98 atom % of Pd and traces amount of adsorbed Cl⁻ ions that help stabilize the Pd SPs in polar solvents. FIG. 14 panel (f) is a corresponding SAED pattern of porous Pd SPs which is identified to match well with Pd. The porous Pd SPs exhibit good crystallinity with an fcc lattice.

Preparation and Characterization of $RhI_3$/AgI SPs, Rh/Ag SPs and Rh SPs

Figure 15:
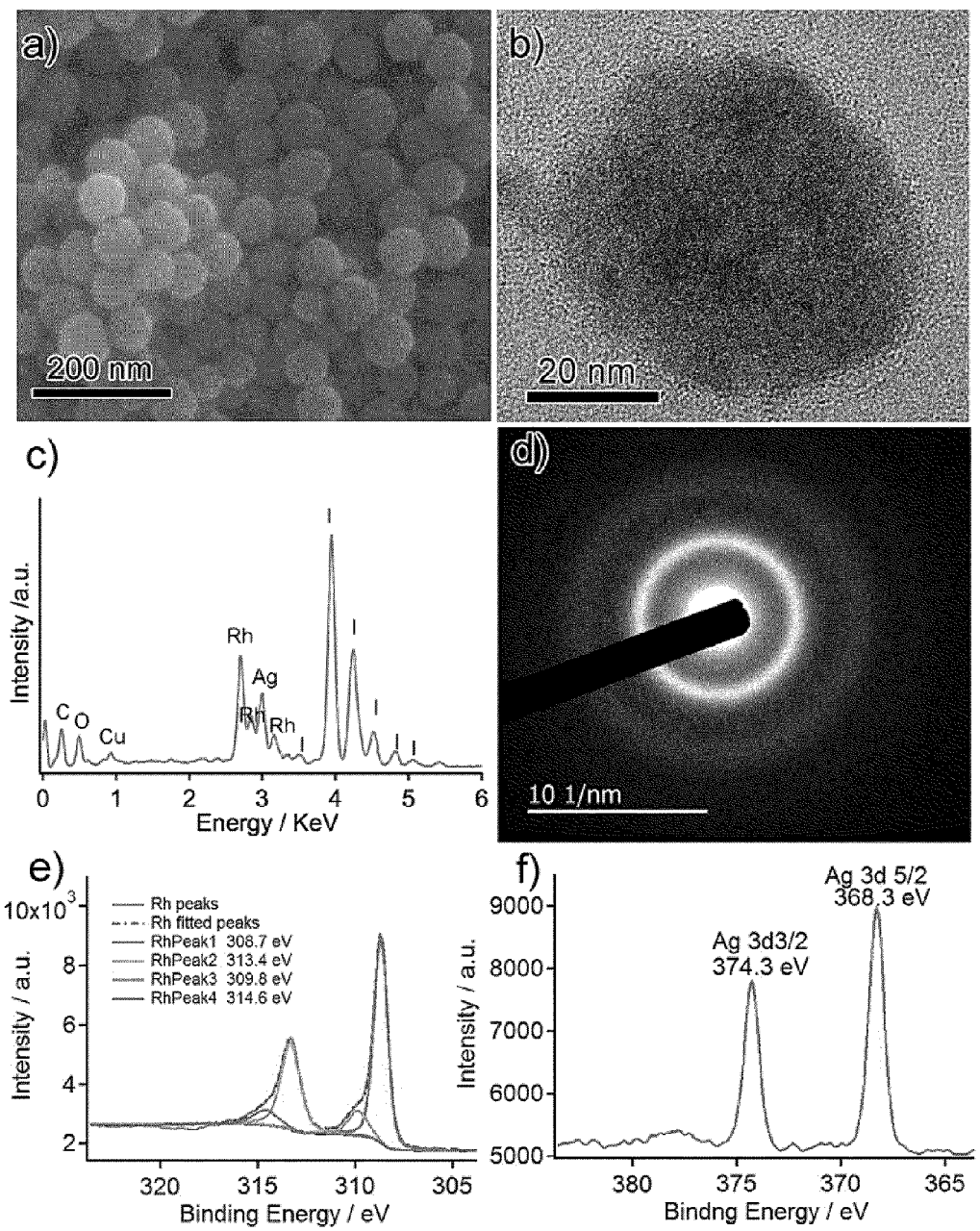
FIG. 15 panel (a) is a representative scanning electron microscope (SEM) image of as-synthesized $RhI_3$/AgI amorphous SPs; panel (b) is an enlarged TEM image of a single $RhI_3$/AgI nanoparticle, showing no long range periodic lattices; panel (c) is an EDS analysis of the $RhI_3$/AgI nanoparticles; d) SAED pattern of $RhI_3$/AgI nanoparticles shows the amorphous feature; panel e) is a X-ray photoelectron spectroscopy (XPS) spectrum of $Rh_{3d}$ region; and panel (f) is an XPS spectrum of $Ag_{3d}$ region shows two peaks that can be indexed to $Ag^+$ in AgI.

FIG. 15 panel (a) is an SEM image of $RhI_3$/AgI SPs and FIG. 15 panel (b) is an enlarged TEM image of a single $RhI_3$/AgI SP synthesized using the variation of the method 400. A glass vial (20 mL) containing aqueous silver colloidal nanoparticle solution (4 mL), DI water (4 mL) and aqueous KI (0.1 M, 2 mL) is first heated to boiling by a heating plate. The light grey aqueous dispersion turned light pale white. Then aqueous solution of $Na_3RhCl_6$ (0.01 M) is added drop wise at an addition rate of 10 μL/s while the dispersion is kept boiling. During the addition, a brown color is gradually produced, indicating the formation of $RhI_3$/AgI SPs. The dispersion is left to heat for another 10 minutes until a dark brown color formed. Magnetic stirring is applied during the whole process. The dispersion is later removed from heat, allowed to cool and stay undisturbed for about 30 minutes. Finally the dark brown supernatant is collected, centrifuged at 13,000 rpm for 10 min and washed with DI water 3 times.

FIG. 15 panel (c) is an EDS spectrum of the $RhI_3$/AgI nanoparticles which identifies the elements incorporated in the nanoparticles. It shows the averaged abundance of I 70 atom %, Rh 23 atom % and Ag 7 atom % respectively. FIG. 15 panel (d) is a SAED pattern of RhI$_3$/AgI nanoparticles showing the amorphous feature. The chemical states of each element in the nanoparticles can be clarified by X-ray photoelectron spectroscopy (XPS) measurement after calibration with C 1s 284.7 eV as a reference level. FIG. 15 panel (e) is an X-ray photoelectron spectroscopy (XPS) spectrum of Rh3d region, which can be fitted into two sets of peaks: a set of main peak with binding energies at 308.7 eV and 313.3 eV can be indexed to Rh$^{3+}$ in RhI$_3$ while the other set with binding energies at 309.9 eV and 314.2 eV can be corresponded to oxidized Rh (x+) separately. FIG. 15 panel (f) is an XPS spectrum of Ag3d region showing two peaks that can be indexed to Ag$^+$ in AgI.

To prepare Rh/Ag SPs, the precipitated RhI$_3$/AgI particles are redispersed in 10 mL DI water. Freshly prepared aqueous solution of NaBH$_4$ (0.1 M, 300 µL) is then drop wise added into the dispersion with magnetic stirring. The color of the solution changes to light grey blue which is highly transparency. The resulting porous Rh/Ag SPs are washed with DI water 3 times and further dispersed in ethanol (6 mL).

Figure 16:
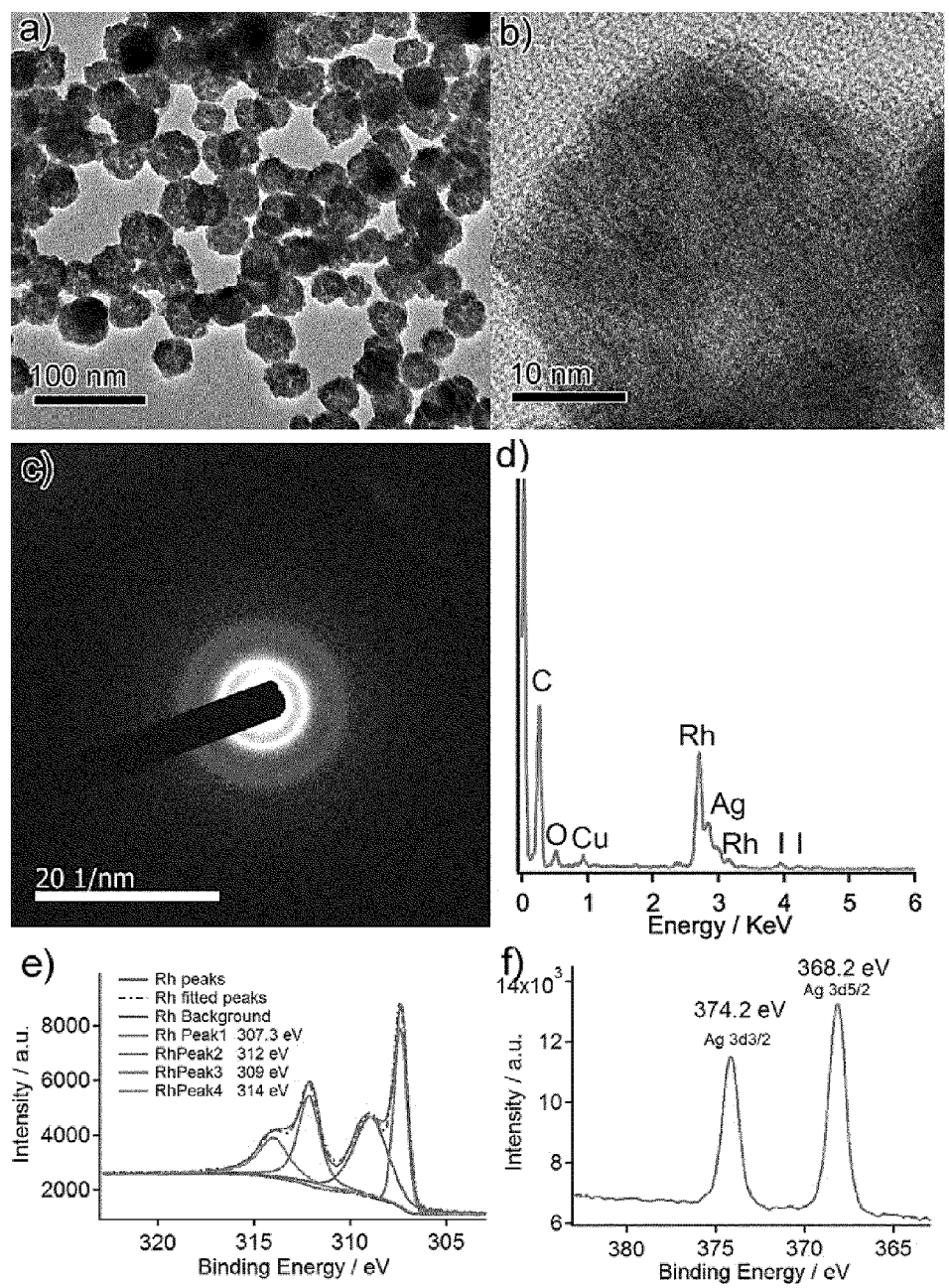
FIG. 16 panel (a) is a representative TEM image of porous Rh/Ag SPs that are synthesized by the reduction of amorphous $RhI_3$/AgI nanoparticles with a sodium borohydride ($NaBH_4$) aqueous solution; panel (b) is a HRTEM image of porous Rh/Ag SPs; panel (c) is a typical ED pattern of the porous Rh/Ag SPs; panel (d) is an EDS spectrum of the porous Rh/Ag SPs which shows the major composition is Ag and Rh with trace amount of I; panel (e) is a XPS spectrum of $Rh_{3d}$ region; and panel (f) is a XPS spectrum of $Ag_{3d}$ region.

FIG. 16 panel (a) is a representative TEM image of porous Rh/Ag SPs. The size of the SPs greatly decreased compared to original RhI$_3$/AgI nanoparticles because a large portion of iodide ions are released into the solvent during the reduction of Rh$^{3+}$ ions and Ag$^+$ ions. FIG. 16 panel (b) is a HRTEM image of the porous Rh/Ag SPs showing no long-range periodic lattices, which demonstrates the poor crystallinity of the SPs. FIG. 16 panel (c) shows a typical electron diffraction pattern of the porous Rh/Ag SPs showing only typical blurred rings from carbon film on the TEM grid. FIG. 16 panel (d) is an EDS spectrum of the porous Rh/Ag SPs which shows the major composition is composed of Ag and Rh with trace amount of I. The greatly decreased content of I is confirmed, showing that the porous SPs are consisted of 80 atom % of Rh, 17 atom % of Ag and 3 atom % of I. The reduction of Rh$^{3+}$ and Ag$^+$ is further supported by the XPS analysis (panels (e) and (f)) as the corresponding binding energies shift to lower photon energy range. FIG. 16 panel (e) is an XPS spectrum of Rh3d region, which are composed of two sets of peaks: a set of main peak corresponding to Rh(0) and a set shoulder peaks for Rh(3+). The curve can be fitted and the set of peaks with the binding energy at 307.3 eV and 312 eV can be correlated to Rh(0) and while those at 309 eV and 314 eV can be indexed to Rh(3+) from Rh$_2$O$_3$. FIG. 16 panel (f) is an XPS spectrum of Ag3d region which show two peaks that can be indexed to Ag(0).

Rh SPs can be obtained from the Rh/Ag SPs by a solvothermal treatment in a solvent such as ethanol. The Rh/Ag SPs are dispersed in ethanol and subjected to a solvothermal treatment process at 150 degrees Celsius for about 20 minutes at about 41 psi. The finally produced Rh SPs are centrifuged and redispersed in ethanol for further characterization.

Figure 17:
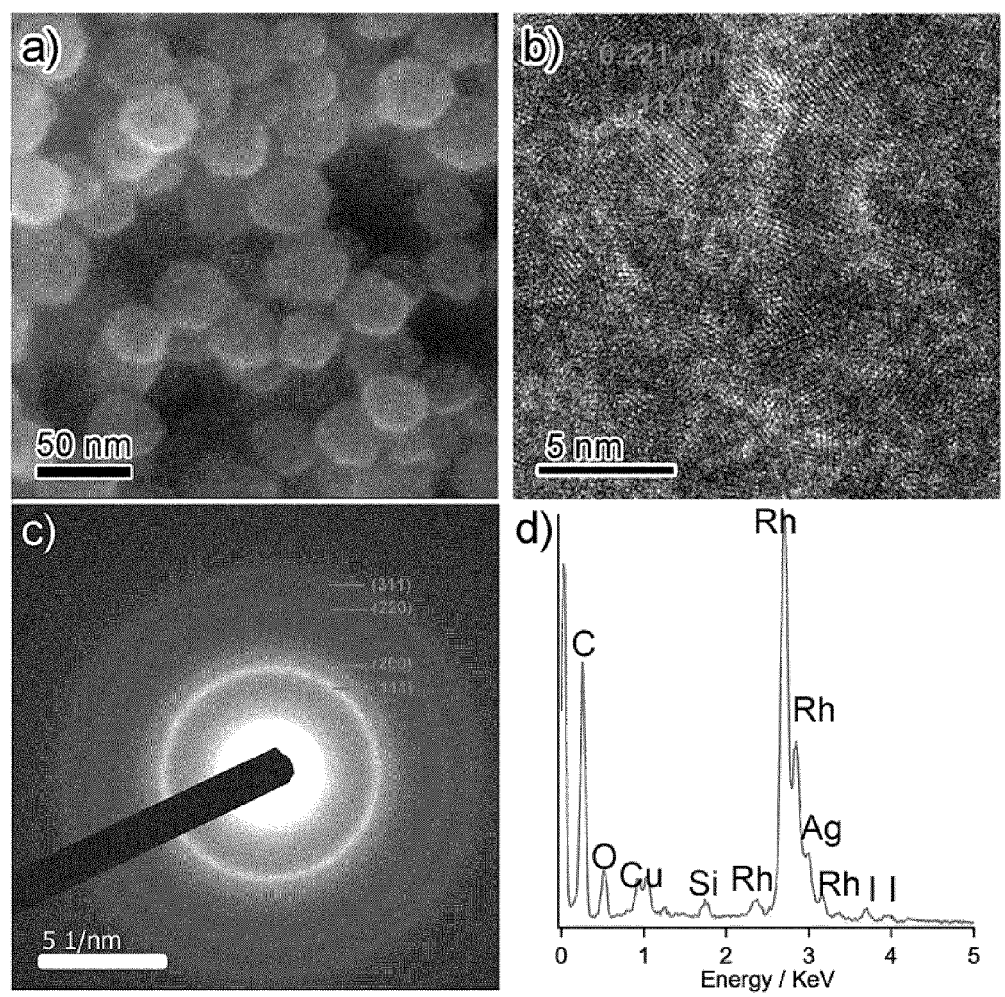
FIG. 17 panel a) is a representative SEM image of porous Rh SPs obtained after solvothermal treatment of Rh/Ag SPs with ethanol at 150 degrees Celsius for 20 minutes; panel (b) is a HRTEM image of a porous Rh SP; panel (c) is a SAED pattern of the porous Rh SPs; and panel (d) is an EDS spectrum for elemental analysis demonstrates the major composition of Rh of 92 atom % with traces amount of Ag (6 atom %) and I (2 atom %) residues.

FIG. 17 panel (a) is a representative SEM image of porous Rh SPs obtained after solvothermal treatment of Rh/Ag SPs. The rough surface of the SPs can be clearly observed. The porous Rh SPs maintain the morphologies of the Rh/Ag SPs without obvious changes in size and size distribution. FIG. 17 panel (b) is a HRTEM image of a porous Rh SP that shows the good crystallinity. FIG. 17 panel (c) is a SAED pattern of the porous Rh SPs that can be indexed as a typical fcc Rh diffraction pattern. FIG. 17 panel (d) is an EDS spectrum for elemental analysis demonstrating the major composition of Rh of 92 atom % with traces amount of Ag (6 atom %) and I (2 atom %) residues. Thus the solvothermal treatment process results in the production of porous Rh SPs with improved Rh purity as well as better crystallinity.

Preparation and Characterization of IrI$_3$/AgI SPs and Ir/AgI SPs

Figure 18:
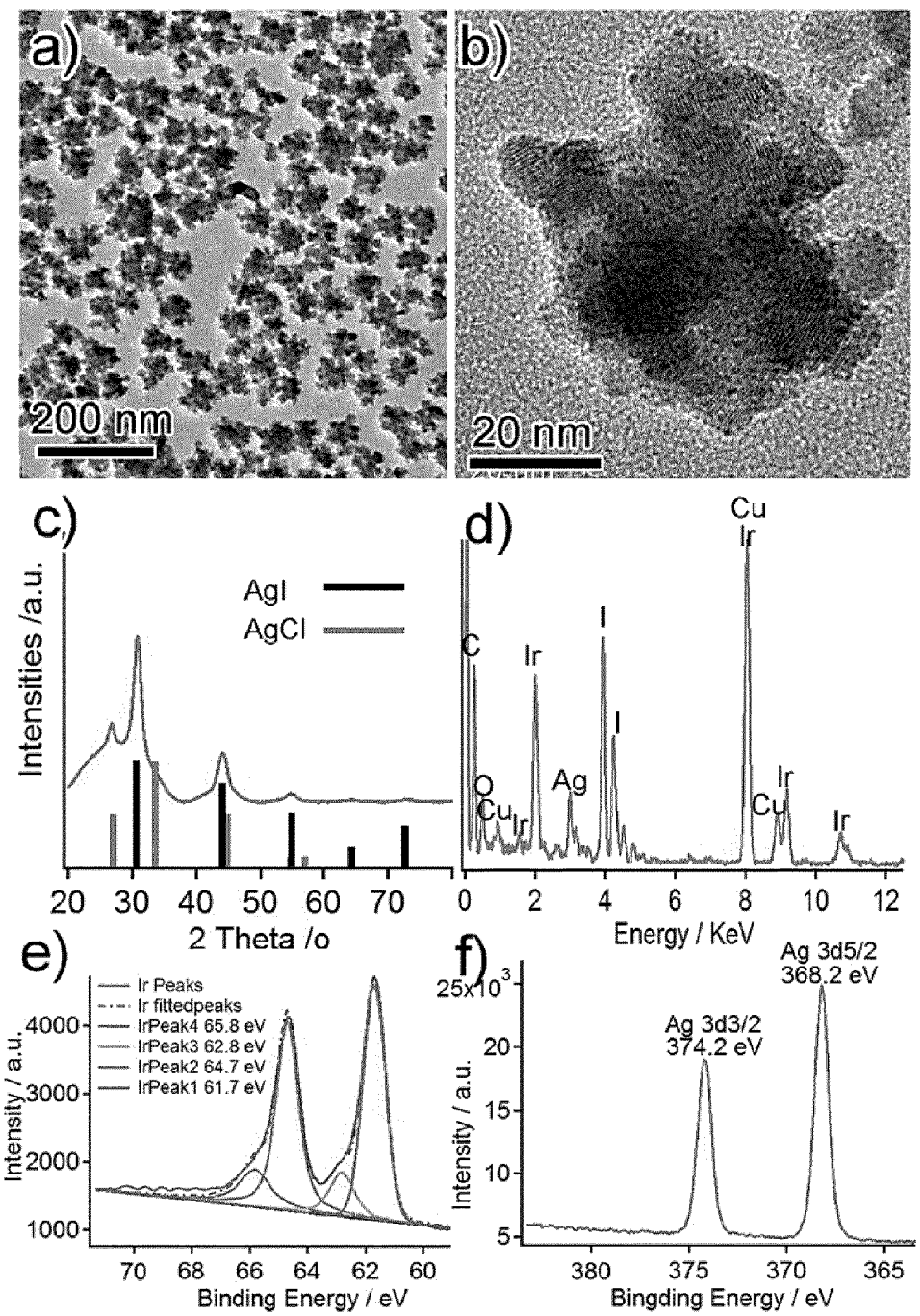
FIG. 18 panel (a) is a low magnification TEM image of the $IrI_3$/AgI composited SPs; panel (b) is an enlarged TEM image of a single $IrI_3$/AgI SP which is composed of AgI nanocrystals; panel (c) is an XRD pattern of the $IrI_3$/AgI composited SPs with peaks can be indexed to cubic AgI and AgCl; panel (d) is an EDS pattern of the $IrI_3$/AgI SPs showing that the I, Ir and Ag are the main compositions; panel (e) is a XPS spectrum of $Ir_{3d}$ region; and panel (f) is a XPS spectrum of $Ag_{3d}$ region.

FIG. 18 panel (a) is a low magnification TEM image of a IrI$_3$/AgI SPs and FIG. 18 panel (b) is an enlarge TEM image of a single IrI$_3$/AgI SP. The IrI$_3$/AgI SPs are prepared similar to the RhI$_3$/AgI SPs. A glass vial (20 mL) containing aqueous silver colloidal nanoparticle solution (4 mL), DI water (4 mL) and aqueous KI solution (0.1 M, 2 mL) is first heated to boiling by a heating plate. The light grey aqueous dispersion turned light pale white. Then Na$_3$IrCl$_6$ (0.01 M, 1000 µL) is added drop wise at an addition rate of 10 µL/s while the dispersion is kept boiling. During the addition, an orange color is gradually produced, indicating the redox reaction occurs. After addition, the dispersion is left to heat for another 10 minutes until a deep orange color is formed. Magnetic stirring is applied during the whole process. The dispersion is later removed from heat, allowed to cool and stay undisturbed for about 30 minutes. Finally the deep orange supernatant is collected, centrifuged at 13,000 rpm for 10 min and washed with DI water 3 times to obtain the IrI$_3$/AgI SPs.

Figure 19:
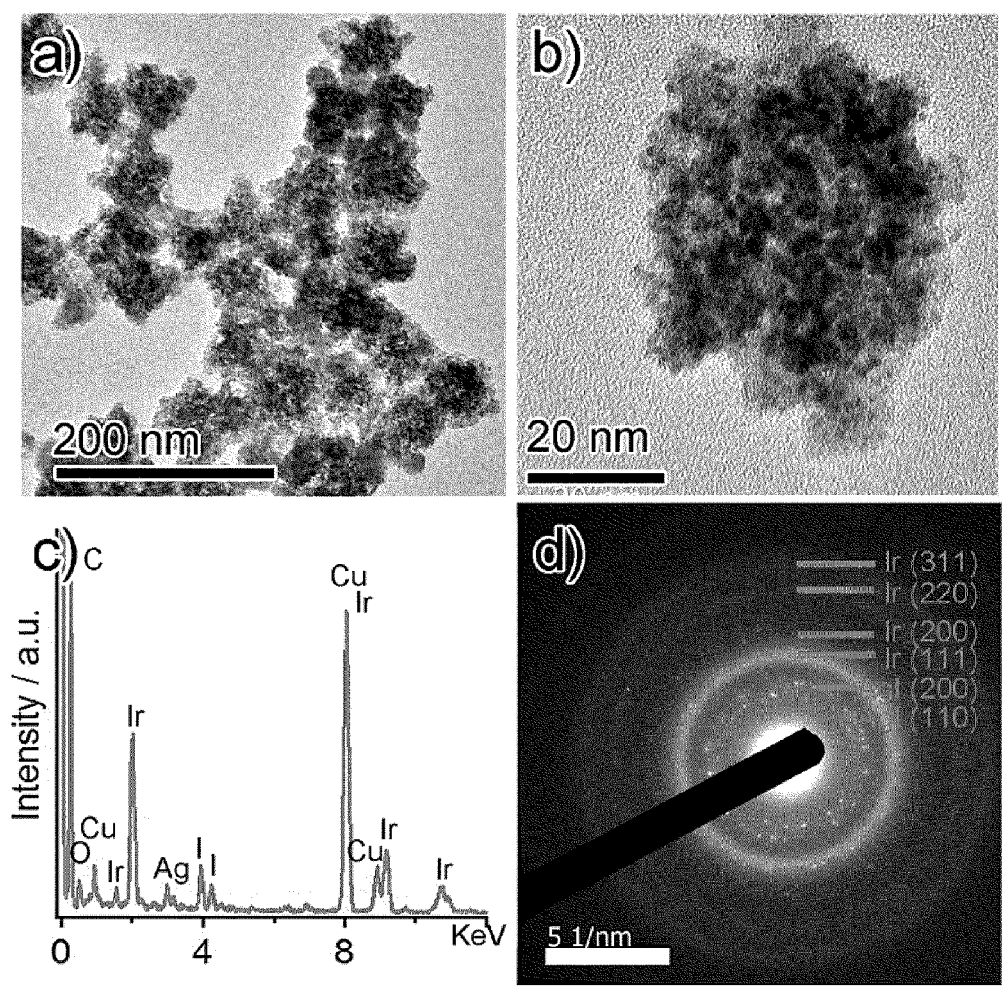
FIG. 19 panel (a) is a representative TEM image of Ir/AgI SPs that are synthesized by the solvothermal treatment of $IrI_3$/AgI nanoparticles with ethanol at 150 degrees Celsius for 20 minutes; panel (b) is an enlarged TEM image of a single Ir—AgI SP which indicates the high density of Ir nanocrystals decorated on the support of AgI nanocrystal cluster; panel (c) is an EDS spectrum of the Ir/AgI SPs; and (d) is a SAED pattern of Ir—AgI SPs showing two sets of characteristic ring patterns that can be indexed to Ir and AgI respectively.

The uniform SPs adopt nanodendritic shapes rather than spherical shapes. The enlarged TEM image of FIG. 18 panel (b) further reveals that the AgI in the IrI$_3$/AgI SPs are already crystalline, which is different from RhI$_3$/AgI nanoparticles. FIG. 19 panel (c) is an XRD pattern of the IrI$_3$/AgI composite SPs with peaks which can be indexed to cubic AgI and AgCl. The IrI$_3$ is believed to be amorphous since no characteristic diffraction peaks of IrI$_3$ can be obtained.

FIG. 18 panel (d) is an EDS spectrum of the IrI$_3$/AgI SPs showing that the I, Ir and Ag are the main compositions with concentrations of I 62.4 atom %, Ag 18.5 atom %, Ir 15.8 atom %. Trace amount of Cl 3.3 atom % is also detected. FIG. 18 panel (e) is an XPS spectrum of Ir3d region which can be fitted to two sets of peaks: one set of main peaks with binding energies of 61.7 eV and 64.7 eV can be indexed to Ir$^{3+}$ in IrI$_3$; the other set of shoulder peaks with binding energies of 62.8 eV and 65.8 eV can be referred to Ir$^{4+}$ in oxidized state. It shows that Ir$^{3+}$ keeps the original oxidized chemical state without going through oxidation-reduction reactions. FIG. 18 panel (f) is an XPS spectrum of Ag3d region showing two characteristic peaks with binding energies at 368.2 eV and 374.2 eV corresponding to Ag$^+$ in AgI.

Ir/AgI SPs can be obtained from the Ir$_3$I/AgI SPs using a solvothermal treatment process in a solvent solution as described herein. The as-synthesized IrI$_3$/AgI SPs are redispersed in 6 mL ethanol and subjected to a solvothermal treatment in ethanol at 150 degrees Celsius for 20 minutes at 41 psi. The color turns from orange to light grey brown. The finally produced Ir/AgI SPs are centrifuged and redispersed in ethanol (3 mL) for further characterization.

FIG. 19 panel (a) is a representative TEM image of Ir/AgI SPs and FIG. 19 panel (b) is an enlarged TEM image of a single Ir/AgI SP which indicates the high density of Ir nanocrystals on the support of AgI nanocrystal cluster. AgI nanocrystals help maintain the structures of the Ir/AgI SPs since they act as solid supports for the newly formed small Ir nanocrystals to stabilize on. Thus, the solvothermal treatment is not performed for a prolonged time to prevent dissolution of all the AgI which can result in destabilization of the Ir nanocrystals. FIG. 19 panel (c) is an EDS spectrum of the Ir/AgI SPs with the major compositions of Ir 48 atom %, Ag 17.2 atom %, I 31 atom % and trace amount of Cl. FIG. 19 panel (d) is a SAED pattern of Ir/AgI SPs showing two sets of characteristic ring patterns that can be indexed to Ir and AgI respectively.

Catalytic Conversion Efficiency of Pt SPs

The potential of Pt SPs as catalysts is demonstrated in the catalysis of hexacyanoferrate (III) (Fe(CN)$_6^{3-}$) reduction reaction by thiosulfate ions (SO$_2$O$_3^{2-}$). The catalytic conversion efficiency of the Pt SPs is determined and compared with the catalytic conversion efficiency of PAA-capped Pt nanocrystals prepared using a known method.

Briefly PAA-capped Pt nanocrystals are synthesized using a modified polyol process, by reducing Na$_2$PtCl$_4$ at the high temperature of the solvent. Ethylene glycol (EG) is used as the solvent as well as the reducing agent. PAA is used as a surfactant. In a typical synthesis, Na$_2$PtCl$_4$ (0.1 g) dissolved in EG (3 mL) at room temperature is quickly injected into a solution of EG (15 mL) and PAA (0.030 M) at 180 degrees Celsius with vigorous stirring under a protective nitrogen atmosphere. Samples are cooled to room temperature, cleaned two times by precipitation with acetone followed by centrifugation at 11,000 rpm, and finally re-dispersed in distilled water. The Pt SPs are prepared as described with respect to the method of FIG. 7.

Figure 20:
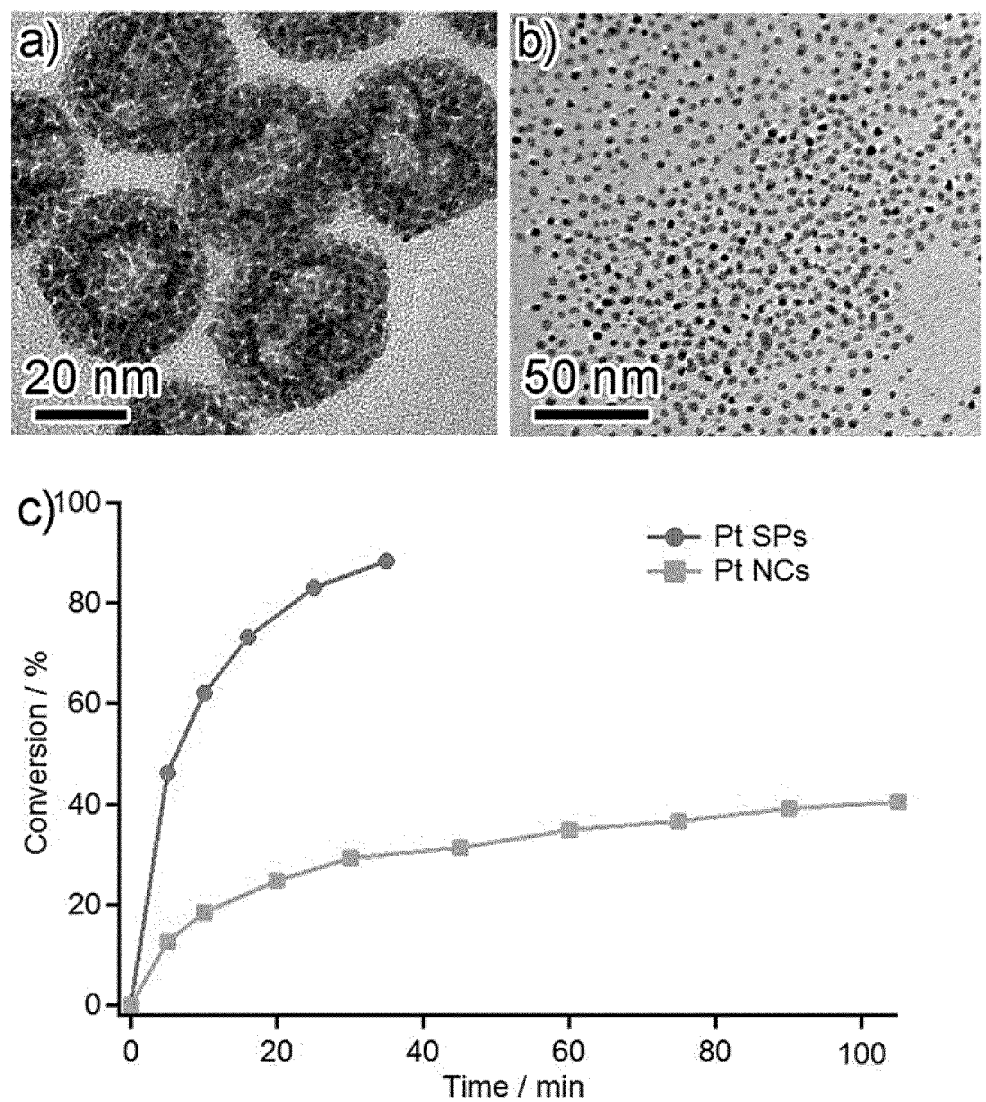
FIG. 20 panel (a) is a representative TEM image of porous Pt SPs with averaged size of 34 nm; panel (b) is a representative TEM image of polyaniline alcohol (PAA)-capped Pt nanocrystals with size of about 4 nm; and panel (c) is a plot of catalytic conversion efficiency of hexacyanoferrate in the reduction reaction as a function of reaction time catalyzed by each of the Pt SPs and PAA capped Pt nanocrystals.

FIG. 20 panel (a) is a representative TEM image of a) porous Pt SPs with averaged size of 34 nm and FIG. 20 panel (b) is a TEM image of the PAA-capped Pt nanocrystals with size of about 4 nm. Both, the Pt SPs and the PAA-capped Pt nanocrystals are used as the catalysts for the hexacyanoferrate (III) (Fe(CN)$_6^{3-}$) reduction reaction by thiosulfate ions (S$_2$O$_3^{2-}$). FIG. 20 panel (c) is a plot of catalytic conversion efficiency (referred to as "conversion %" on Y axis) of hexacyanoferrate in the reduction reaction as a function of reaction time for both structures. The Pt SPs have a catalytic conversion efficiency for reduction of hexacyanoferrate of about 88% after 35 minutes. In contrast, the PAA-capped Pt nanostructures had a catalytic conversion efficiency of only about 40% even after letting the catalytic reduction run for about 100 minutes.

Figure 21:
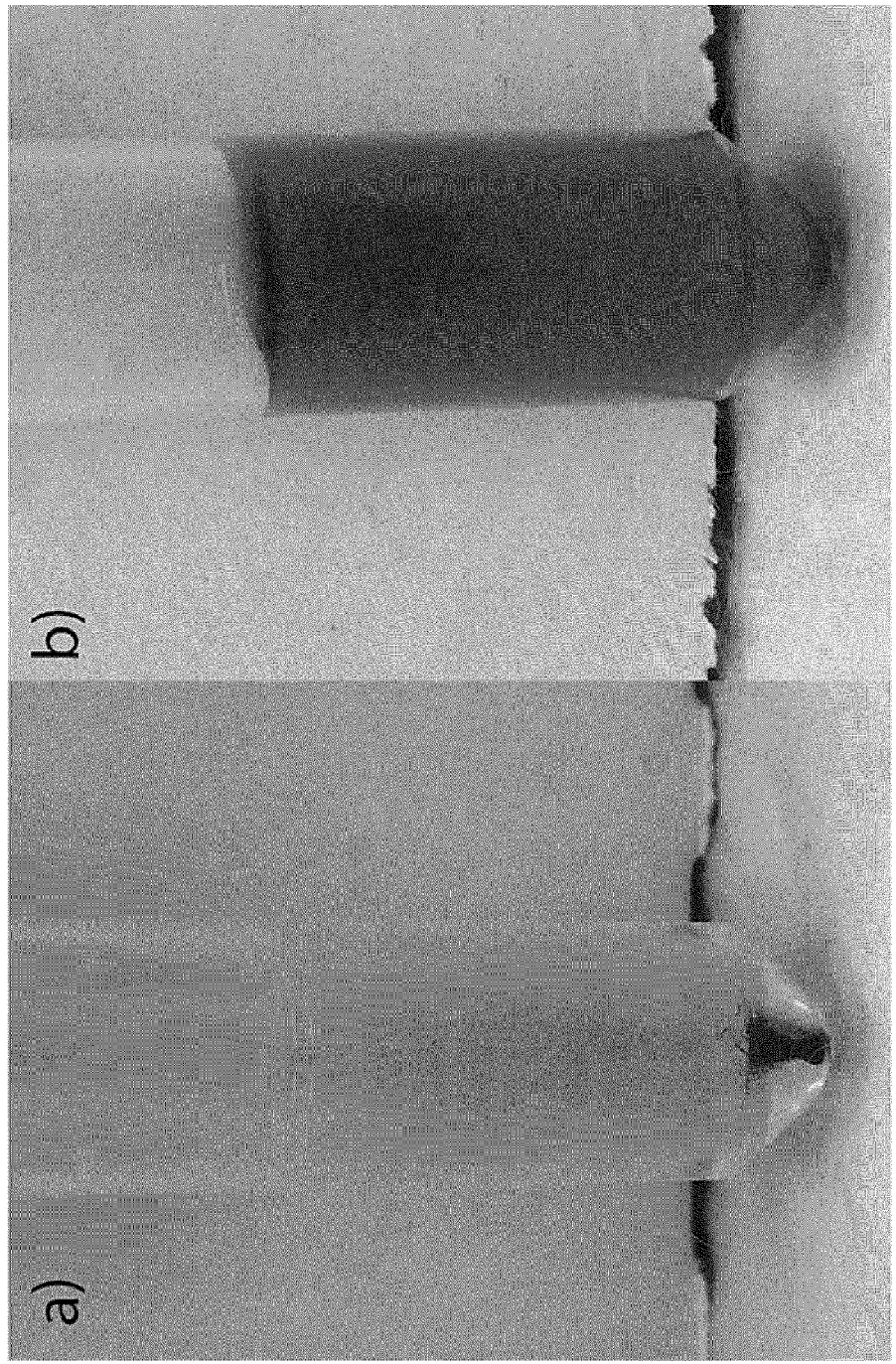
FIG. 21 panel (a) is an optical image of aqueous porous Pt SPs after centrifugation at 13,000 rpm for 4 min; and panel (b) is an optical image of aqueous Pt PAA capped Pt nanocrystals after centrifugation at 13,000 rpm for 40 min.

Furthermore, the porous Pt SPs can be easily recovered by centrifuge while the PAA-capped Pt nanocrystals are extremely difficult (or even impossible) to recover from the reaction solution. For example, FIG. 21 panel (a) is an optical image porous Pt SPs which are dispersed in water after centrifugation at 13,000 rpm for 4 min. FIG. 21 panel (b) shows aqueous Pt nanocrystals capped with PAA which are also dispersed in water after centrifugation at 13,000 rpm for 40 min. The porous Pt SPs are easily to recycle by centrifugation while the Pt nanocrystals are very difficult to recycle by direct centrifugation. These distinct differences clearly demonstrate the promise of the porous platinum-group metal SPs in high-performance catalysis.

As used herein, the singular forms "a", "an" and "the" include plural referents unless the context clearly dictates otherwise. Thus, for example, the term "a member" is intended to mean a single member or a combination of members, "a material" is intended to mean one or more materials, or a combination thereof.

As used herein, the terms "about" and "approximately" generally mean plus or minus 10% of the stated value. For example, about 0.5 would include 0.45 and 0.55, about 10 would include 9 to 11, about 1000 would include 900 to 1100.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Additionally, it should be understood that features from one embodiment disclosed herein may be combined with features of other embodiments disclosed herein as one of ordinary skill in the art would understand. Other substitutions, modifications, changes and omissions may also be made in the design, operating conditions and arrangement of the various exemplary embodiments without departing from the scope of the present invention.

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

What is claimed is:

1. A method, comprising:
   heating an aqueous solution of colloidal silver particles;
   adding a soluble noble metal halide salt to the aqueous solution, the noble metal halide salt undergoing a redox reaction on a surface of the colloidal silver particles to form at least one of noble metal/silver halide superparticles, noble metal halide/silver halide superparticles and noble metal oxide/silver halide superparticles on the surface of the silver particles;
   maintaining the heat for a predetermined time to consume the silver particles and release the at least one of the noble metal/silver halide superparticles, the noble metal halide/silver halide superparticles and noble metal oxide/silver halide superparticles into the aqueous solution;
   cooling the aqueous solution; and
   separating the at least one of the noble metal/silver halide superparticles, the noble metal halide/silver halide superparticles and noble metal oxide/silver halide superparticles from the aqueous solution.

2. The method of claim 1, wherein the noble metal is platinum or palladium.

3. The method of claim 2, wherein the noble metal is platinum, and wherein the superparticles comprise platinum/silver halide superparticles.

4. The method of claim 3, wherein the method further comprises:

dissolving silver halide from the platinum/silver halide superparticles in an aqueous ammonia solution to produce platinum superparticles,
wherein, a surface of the platinum superparticles is free of organic ligands.

5. The method of claim 2, wherein the noble metal is palladium, and wherein the superparticles comprise palladium/palladium oxide/silver halide superparticles.

6. The method of claim 5, further comprising:
dispersing the palladium/palladium oxide/silver halide superparticles in an aqueous ammonia solution to dissolve the silver halide and produce palladium/palladium oxide superparticles; and
reducing the palladium oxide in the palladium/palladium oxide superparticles in a solution to produce palladium superparticles,
wherein, a surface of the palladium superparticles is free of organic ligands.

7. The method of claim 1, further comprising:
optionally, adding a soluble halide salt to the aqueous solution.

8. The method of claim 7, wherein the noble metal is selected from a group consisting of rhodium and iridium.

9. The method of claim 8, wherein the noble metal is rhodium and the superparticles comprise rhodium halide/silver halide superparticles, the method further comprising:
reducing the rhodium halide/silver halide superparticles in an aqueous solution of sodium borohydride to produce rhodium/silver superparticles.

10. The method of claim 9, further comprising:
solvothermally annealing the rhodium/silver superparticles in a solvent to produce rhodium superparticles,
wherein, a surface of the rhodium superparticles is free of organic ligands.

11. The method of claim 8, wherein the noble metal comprises iridium and the superparticles comprise iridium halide/silver halide superparticles, the method further comprising:
reducing the iridium halide/silver halide superparticles in an alcohol based solution to produce iridium/silver halide superparticles,
wherein, a surface of the iridium/silver halide superparticles is free of organic ligands.

12. The method of claim 1, wherein halide anions are absorbed on the surface of the at least one of the noble metal/silver halide superparticles, the noble metal halide/silver halide superparticles and noble metal oxide/silver halide superparticles, the halide anions producing a negative charge to prevent the at least one of the noble metal/silver halide superparticles and the noble metal halide/silver halide superparticles and noble metal oxide/silver halide superparticles from coalescing.

13. The method of claim 1, wherein the at least one of the noble metal/silver halide superparticles and the noble metal halide/silver halide superparticles and noble metal oxide/silver halide superparticles have a diameter of greater than 20 nm.

14. The method of claim 1, wherein the silver particles include at least one of a silver nanospheres, irregular silver particle aggregates, silver nanowires, gold core silver shell nanoparticles, silver nanosheets and silver microspheres.

15. The method of claim 1, wherein the surface of the silver particles exhibits non-uniform reactivity.

16. A method of fabricating platinum superparticles comprising a plurality of platinum nanoparticles arranged in three-dimensional structure having a hemispherical dome shape with a flat bottom, a hollow interior and a plurality of pores defined between the platinum nanoparticles, the method comprising:
heating an aqueous solution of colloidal silver particles;
adding a soluble platinum halide salt to the aqueous solution, the platinum halide salt undergoing a redox reaction on a surface of the silver particles to form a plurality of platinum/silver halide superparticles disposed on the surface of the silver particles;
maintaining the heat for a predetermined time to consume the silver particles and release the platinum/silver halide superparticles in the aqueous solution, the platinum/silver halide superparticles including a plurality of platinum nanoparticles interspersed with silver halide nanoparticles;
cooling the aqueous solution;
separating the platinum/silver halide superparticles from the aqueous solution; and
incubating the platinum/silver halide superparticles in an aqueous ammonia solution to dissolve the silver halide and produce the platinum superparticles.

17. The method of claim 16, wherein a surface of the platinum superparticles is free of organic ligands.

18. The method of claim 16, wherein the platinum superparticles have a negative zeta potential of lower than −20 eV.

19. The method of claim 16, wherein the platinum superparticles have a diameter of greater than 20 nm.

20. The method of claim 16, wherein the soluble platinum halide salt is $Na_2PtCl_4$.

21. The method of claim 16, wherein the silver particles include at least one of a silver nanospheres, irregular silver particle aggregates, silver nanowires, gold core silver shell nanoparticles, silver nanosheets and silver microspheres.

22. The method of claim 16, wherein at least a portion of a surface of the silver particles is coated with a surfactant.

23. A catalyst, comprising:
noble metal superparticles comprising a plurality of noble metal nanoparticles arranged in a three-dimensional structure, a surface of the noble metal superparticles being free of organic ligands, the noble metal superparticles having a zeta potential sufficient to prevent the noble metal superparticles from aggregating.

24. The catalyst of claim 23, wherein the noble metal is selected from a group consisting of platinum, palladium, rhodium and iridium.

25. The catalyst of claim 24, wherein the noble metal is platinum and the superparticles include platinum superparticles, the platinum superparticles including a plurality of platinum nanoparticles arranged in three-dimensional structure having a hemispherical dome shape with a flat bottom, a hollow interior and a plurality of pores defined between the platinum nanoparticles.

26. The catalyst of claim 25, wherein the platinum superparticles have a negative zeta potential of lower than −20 eV.

27. The catalyst of claim 25, wherein the platinum superparticles have a catalytic conversion efficiency of greater than 80%.

28. The catalyst of claim 24, wherein the noble metal includes iridium and the noble metal superparticles include iridium nanoparticles interspersed with silver halide nanoparticles.

* * * * *